Sept. 3, 1968 W. D. CANNON 3,400,329

METHOD AND MEANS FOR CORRECTING AMPLITUDE AND DELAY DISTORTION IN A TRANSMISSION PATH

Original Filed March 9, 1960 11 Sheets-Sheet 1

FREQUENCY-CYCLES PER SECOND

INVENTOR:
WILLIAM D. CANNON
BY
M. R. Marsh
ATTORNEY

Sept. 3, 1968 W. D. CANNON 3,400,329

METHOD AND MEANS FOR CORRECTING AMPLITUDE AND DELAY DISTORTION IN A TRANSMISSION PATH

Original Filed March 9, 1960 11 Sheets-Sheet 2

INVENTOR:
WILLIAM D. CANNON
BY M. R. Marsh
ATTORNEY

*INVENTOR:*
WILLIAM D. CANNON
*BY* M. R. Marsh
ATTORNEY

INVENTOR:
WILLIAM D. CANNON
BY
M. R. Marsh
ATTORNEY

INVENTOR:
WILLIAM D. CANNON
BY M. R. Marsh
ATTORNEY

INVENTOR:
WILLIAM D. CANNON
BY M.R. Marsh
ATTORNEY

INVENTOR:
WILLIAM D. CANNON
BY
M. R. Marsh
ATTORNEY

INVENTOR:
WILLIAM D. CANNON
BY
M. R. Marsh
ATTORNEY

INVENTOR:
WILLIAM D. CANNON
BY
M. R. Marsh
ATTORNEY

INVENTOR:
WILLIAM D. CANNON
BY
M. R. Marsh
ATTORNEY

Sept. 3, 1968 W. D. CANNON 3,400,329

METHOD AND MEANS FOR CORRECTING AMPLITUDE AND DELAY DISTORTION IN A TRANSMISSION PATH

Original Filed March 9, 1960 11 Sheets-Sheet 11

INVENTOR:
WILLIAM D. CANNON

BY

M. R. Marsh

ATTORNEY

United States Patent Office 3,400,329
Patented Sept. 3, 1968

3,400,329

METHOD AND MEANS FOR CORRECTING AMPLITUDE AND DELAY DISTORTION IN A TRANSMISSION PATH

William D. Cannon, Metuchen, N.J., assignor to The Western Union Telegraph Company, New York, N.Y., a corporation of New York Application Mar. 9, 1960, Ser. No. 13,866, which is a continuation-in-part of application Ser. No. 621,476, Nov. 9, 1956, which in turn is a continuation-in-part of application Ser. No. 469,948, Nov. 19, 1954. Divided and this application Feb. 23, 1965, Ser. No. 434,302
2 Claims. (Cl. 324—57)

ABSTRACT OF THE DISCLOSURE

A method and means for correcting amplitude and delay distortion in a transmission path is disclosed. A plurality of cascaded frequency selective active corrective networks are insertable in the transmission path. Each network has adjustable resistors. A cathode ray oscilloscope is connected to the transmission path to provide patterns whose nonlinearity is a measure of amplitude and delay distortion. By adjusting the resistors until the patterns are linearized, the amplitude and delay distortion in the transmission path is corrected. Various types of delay correction networks are also described.

This application is a division of my co-pending application U.S. Ser. No. 13,866, now abandoned, filed Mar. 9, 1960, which was a continuation-in-part of my co-pending application U.S. Ser. No. 621,476, filed Nov. 9, 1956, now abandoned, which was in turn a continuation-in-part of my earlier application U.S. Ser. No. 469,948, now abandoned, filed Nov. 19, 1954.

The present invention relates to communication circuits such as are used for the transmission and reception of facsimile images and very high-speed telegraph signals, and to the distortion occurring in such signals due to the non-linear attenuation and delay characteristics of the transmission path.

More particularly, the invention concerns procedures and means for recognition and measurement of group or envelope delay occurring in the transmission of modulated signals as a means of investigating the transmission delay characteristic of a transmission path, and for the compensation of this characteristic. The invention contemplates also the measurement of the attenuation characteristic of the transmission path and the compensation of any irregularities occurring therein.

The invention is for a unique method for measuring envelope delay over transmission lines, circuits, or devices of any kind and for whatever purpose so long as this purpose lies within the practicable frequency range of the method. In particular, high-speed pulse transmission types of signals whether sent directly, or modulated on a carrier frequency are susceptible to distortion as a consequence of any non-linearity in the delay characteristic of the transmission path, device or network. Facsimile signals and signals for very high-speed telegraphy, such as are encountered in multi-channel telegraph systems and in systems for the tarnsmission of data at high-speed between business machines, are examples of the type of signal to which the invention is particularly applicable. The invention also includes unique networks for the correction of the measured non-linearities or irregularities in both the transmission delay and the attenuation and sets forth a highly expeditious correction procedure utilizing the measuring instruments and the compensating networks described herein for the purpose of eliminating signal distortion.

It is accordingly an object of the present invention to provide a series of simple basic network types each of which possesses a significant amount of transmission delay.

It is a further object to provide networks possessing delay over a narrow band of frequencies.

Another object is to provide networks possessing delay which is adjustable as to magnitude.

An important object is to provide delay over a wide band of frequencies by connecting in series a plurality of novel delay networks each presenting delay over separate narrow portions uniformly distributed over the wide band.

A supplemental object is to provide a network which possesses significant amounts of both delay and attenuation.

Still another object is to provide a network bearing both delay and attenuation which are each independently adjustable as to magnitude.

A primary object is to provide active type networks for the compensation of irregularities in delay and/or attenuation wherein active, or amplifying, elements are employed in conjunction with passive networks for the purpose of recouping the attenuation losses inherent in the networks.

A primary object is to provide for the compensation of irregularities in delay and/or attenuation by connecting in tandem compensating delay network sections each having unequal input and output impedances with intercoupling amplifying and impedance transforming amplifying elements located between sections so that the individual sections each function in their most efficient manner and are capable of independent adjustment.

Another object includes the use of intermixed active and passive types of delay compensating networks.

An important object is to use any of the aforementioned delay networks for the compensation of delay irregularities in transmission lines, circuits or devices.

A further important object is to cooperatively and in unison conduct measurements of delay and/or attenuation on a transmission channel while adjusting the delay and/or attenuation of my novel networks connected in series therewith for the purpose of compensating any irregularities in delay and/or attenuation in the channel as indicated by the measurements.

Another important object is to provide a measuring instrument and adjustable compensating networks for the implementation of a step-by-step procedure of alternating cooperative measurement and adjustment for the purpose of compensating irregularity in delay and/or attenuation of a transmission circuit or device.

Other objects and advantages of the present invention will appear upon the consideration of the following detailed description of the invention and the drawings, wherein.

Figure 3A:
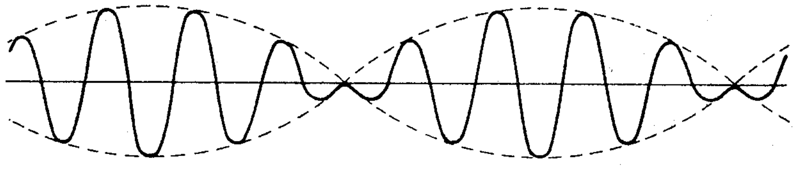
Figure 3B:
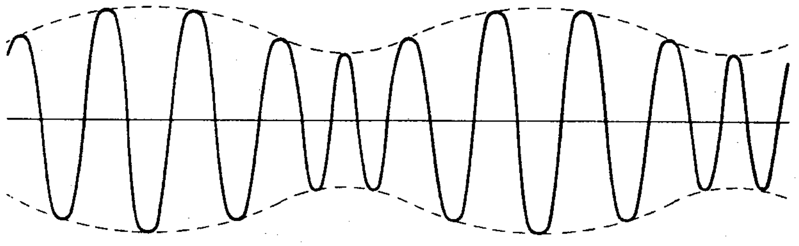
Figure 4:
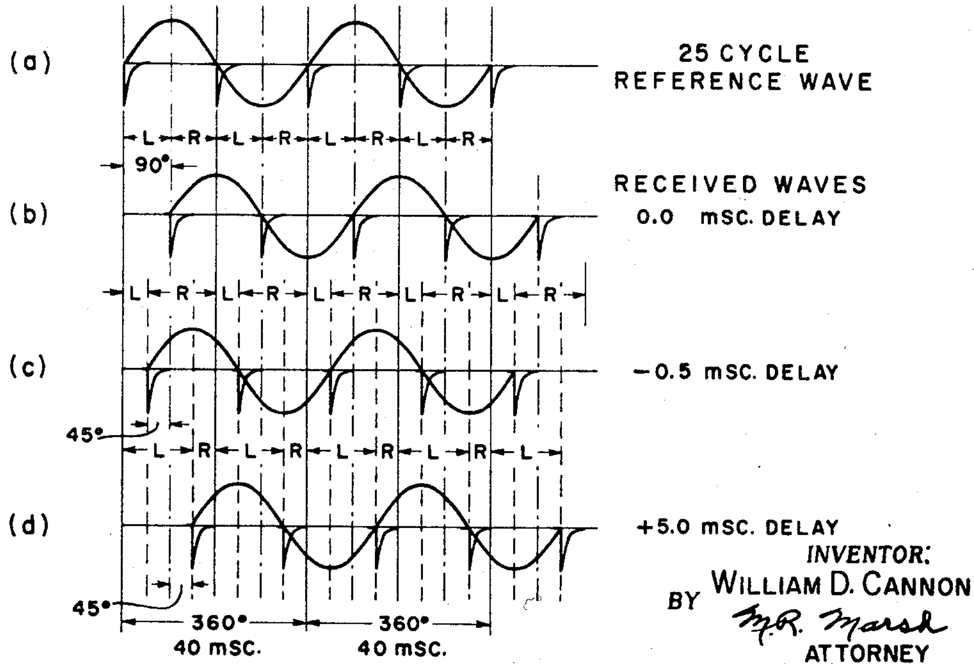
Figure 5:
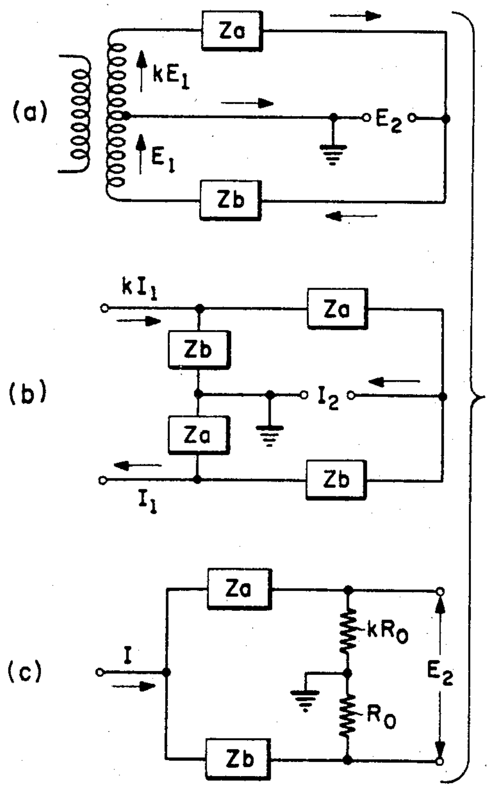
Figure 6:
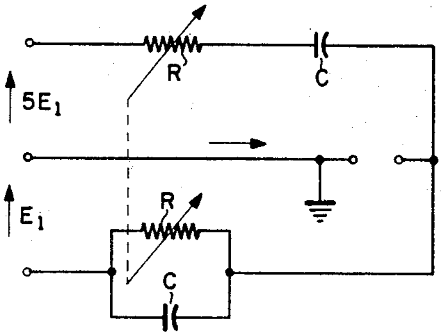
Figure 7:
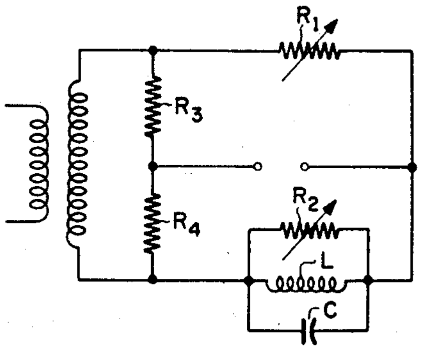
Figure 8:
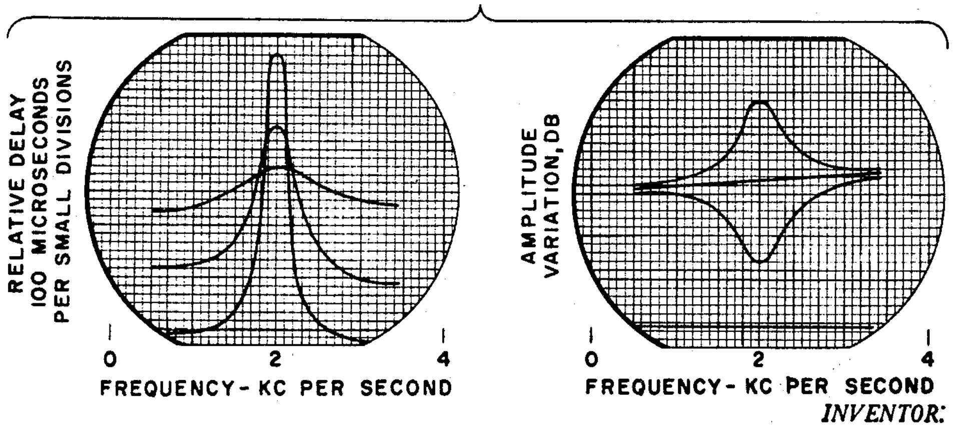
Figure 9:
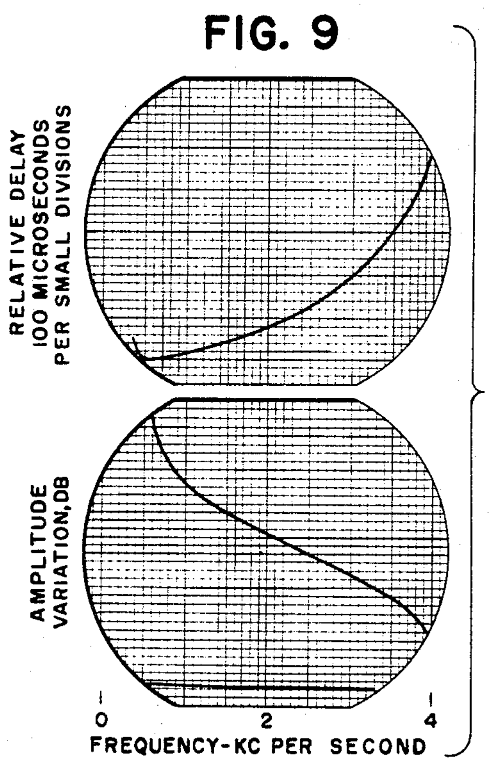
Figure 10:
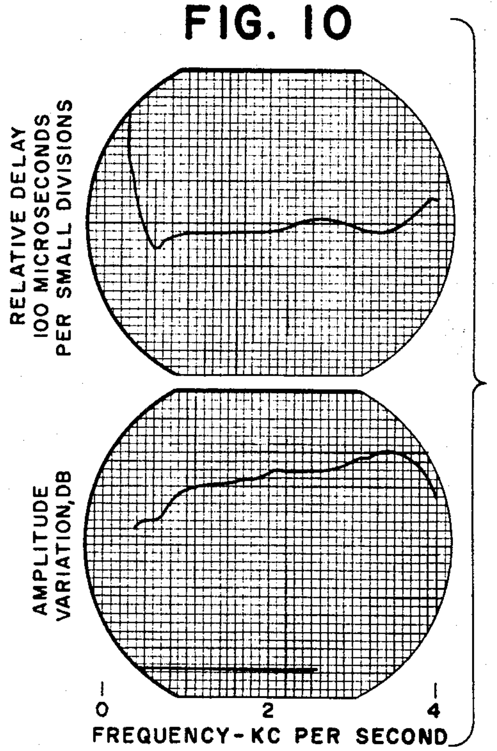
Figure 11:
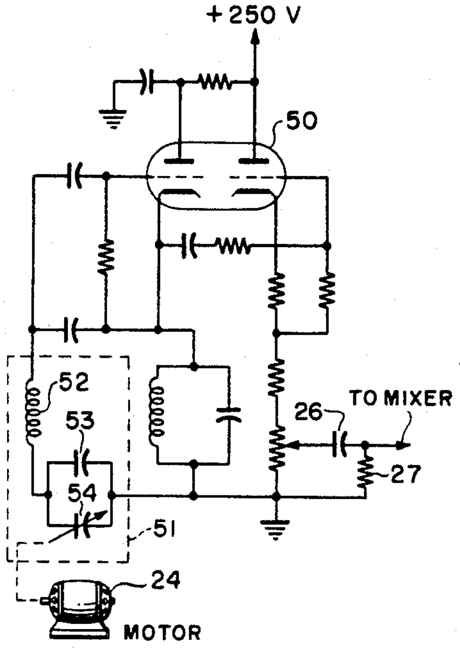
Figure 12:
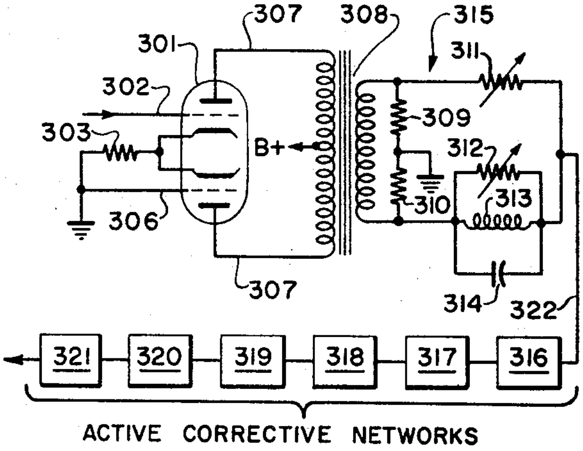
Figures 13, 20, 21:
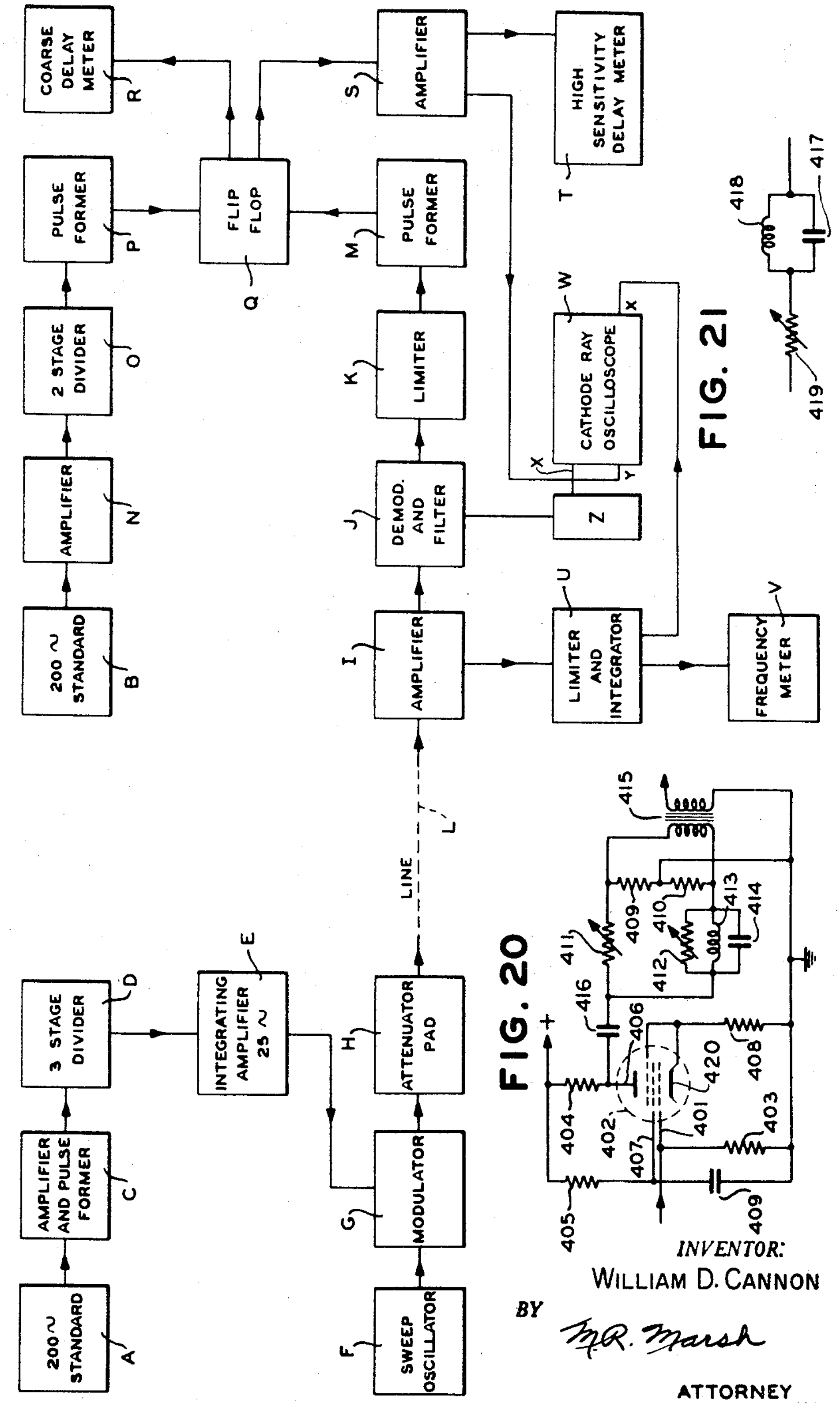
Figure 14:
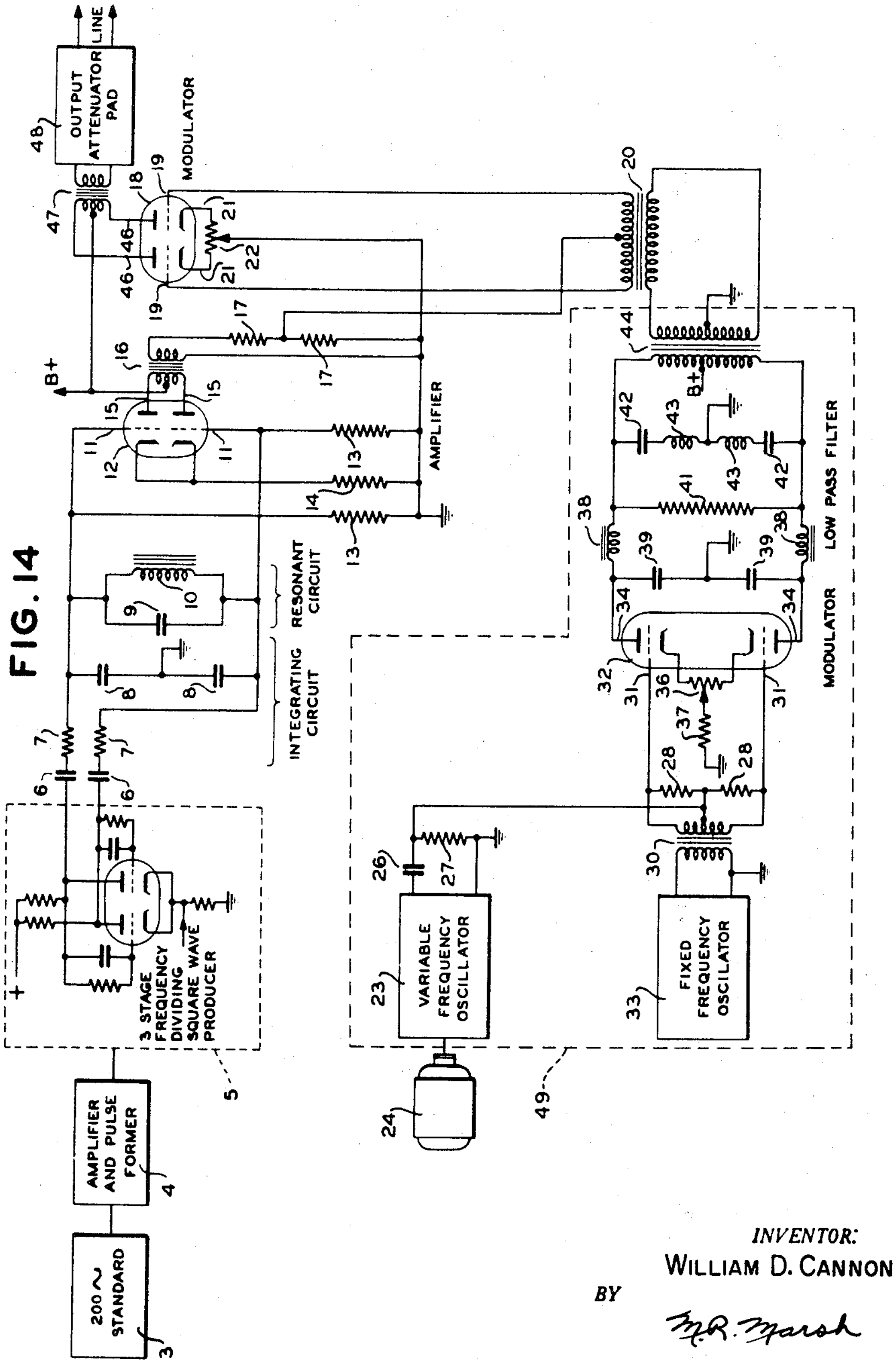
Figure 15:
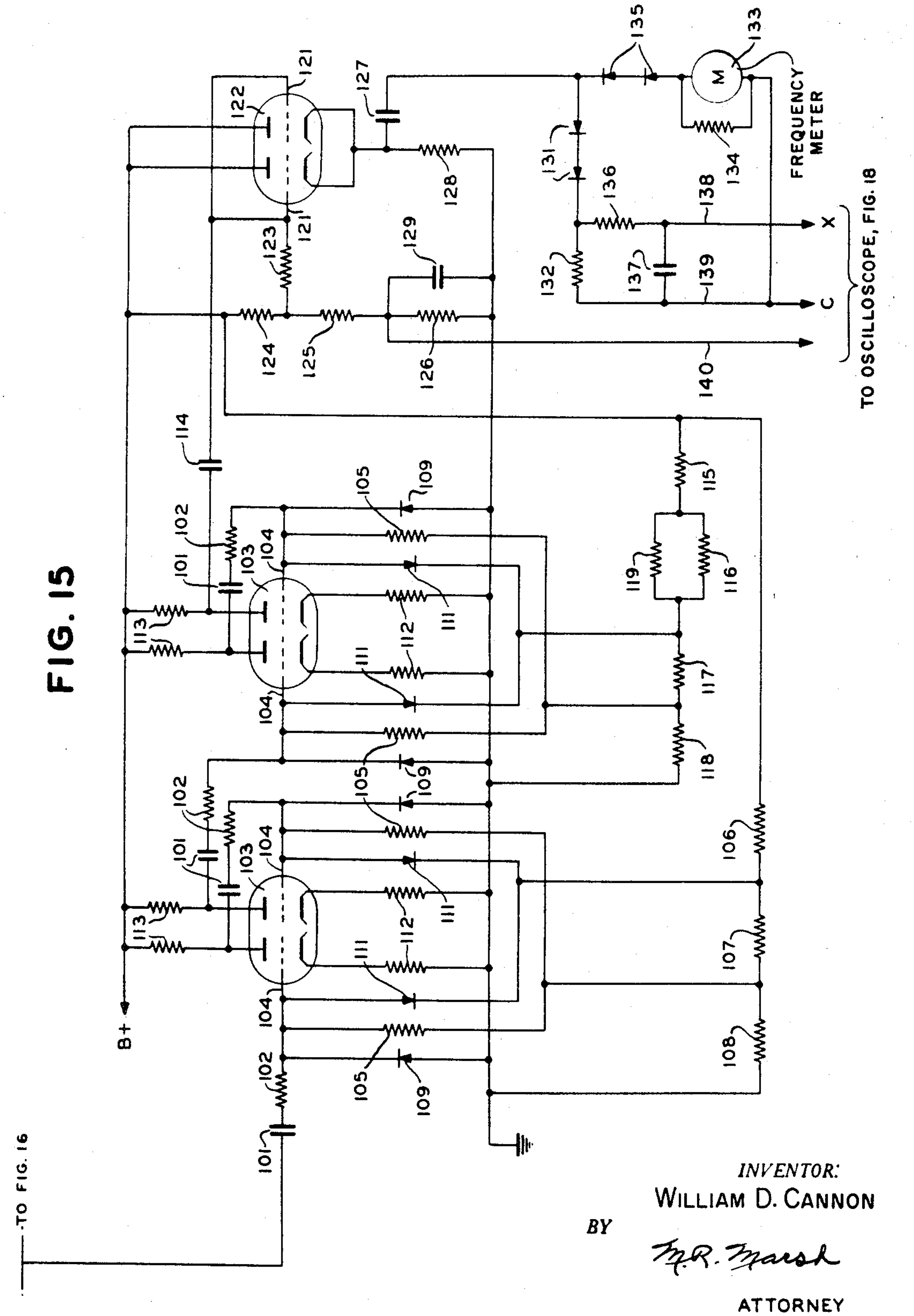
Figure 16:
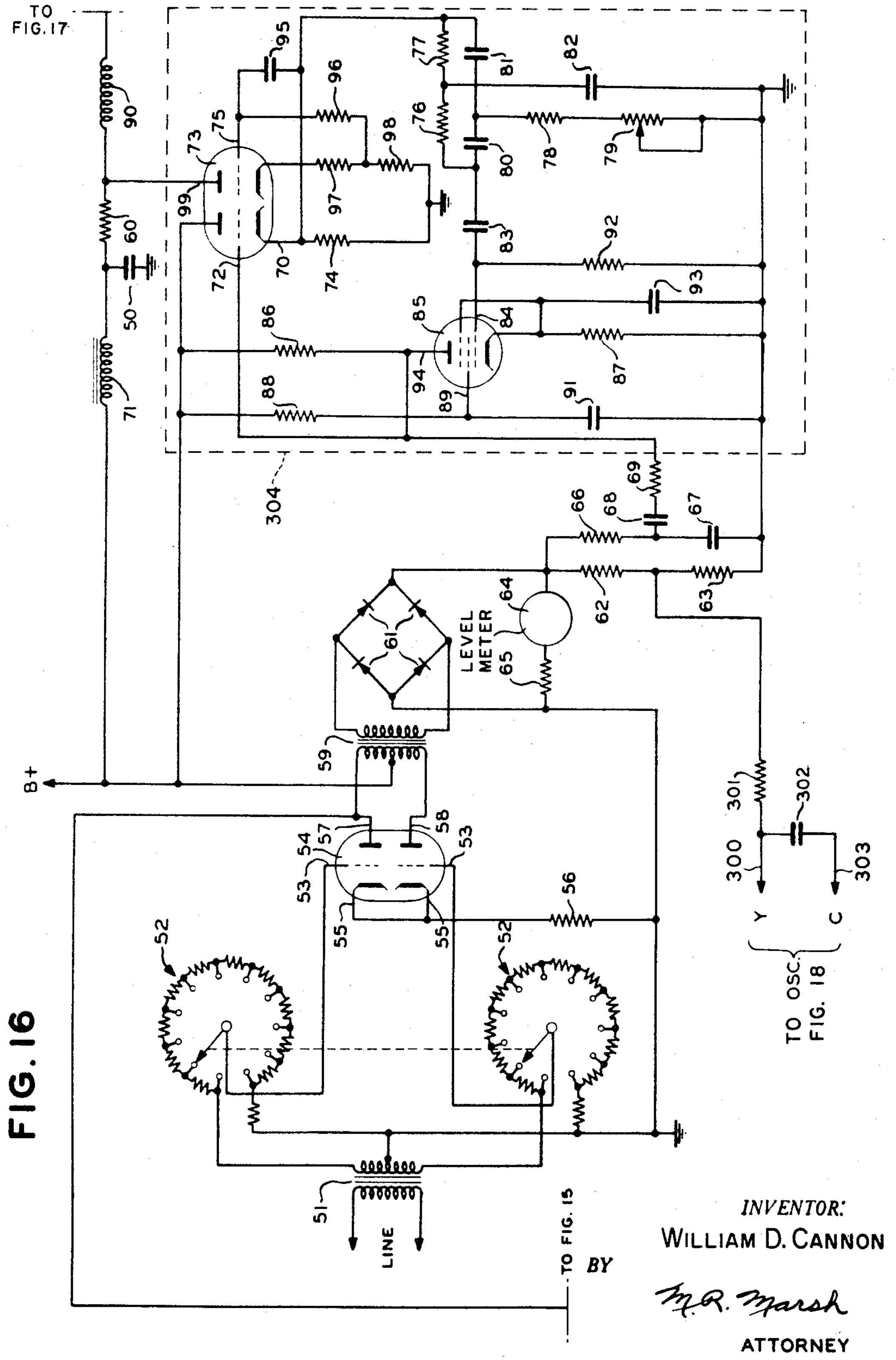
Figures 17, 19:
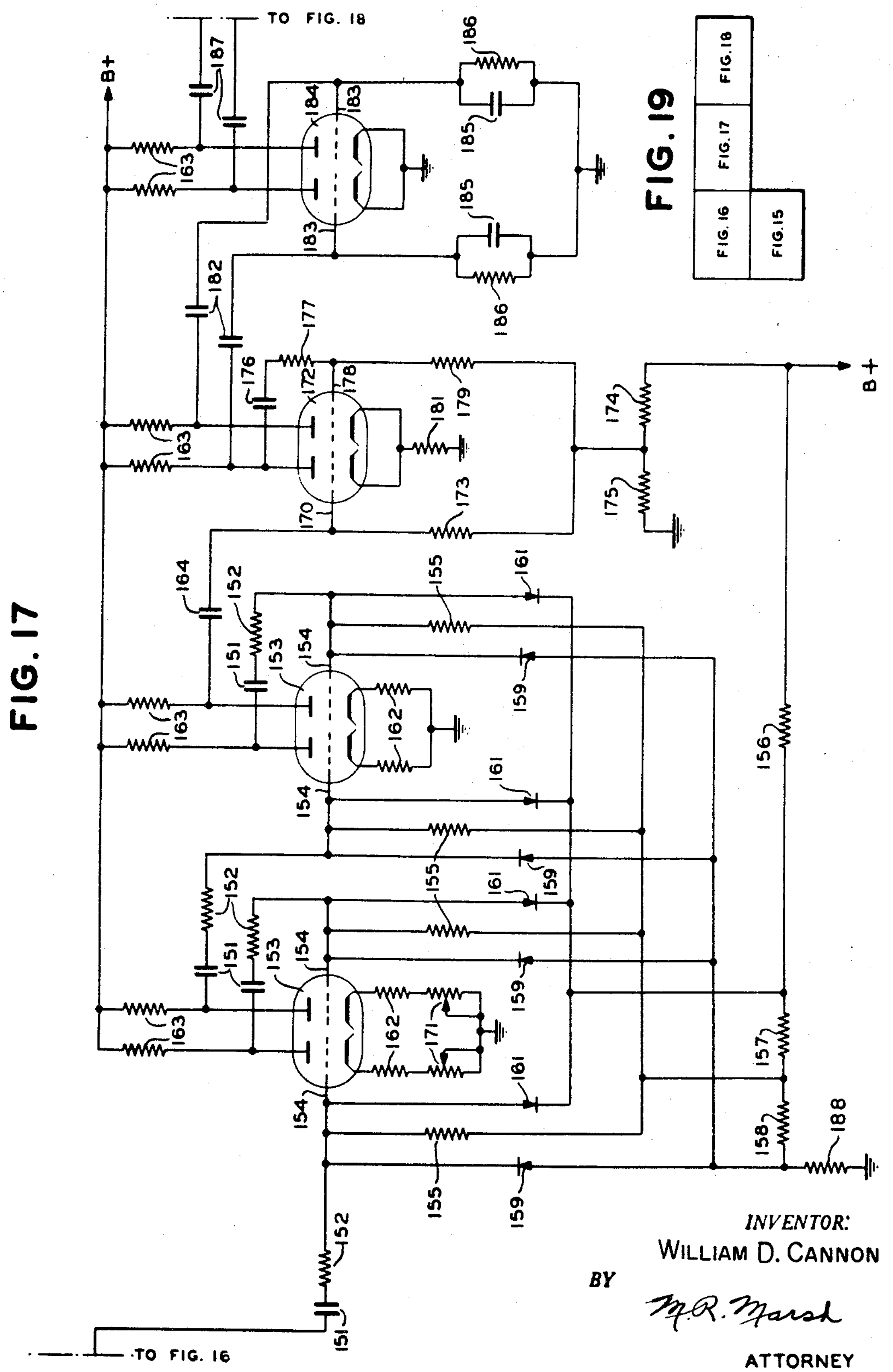
Figure 18:
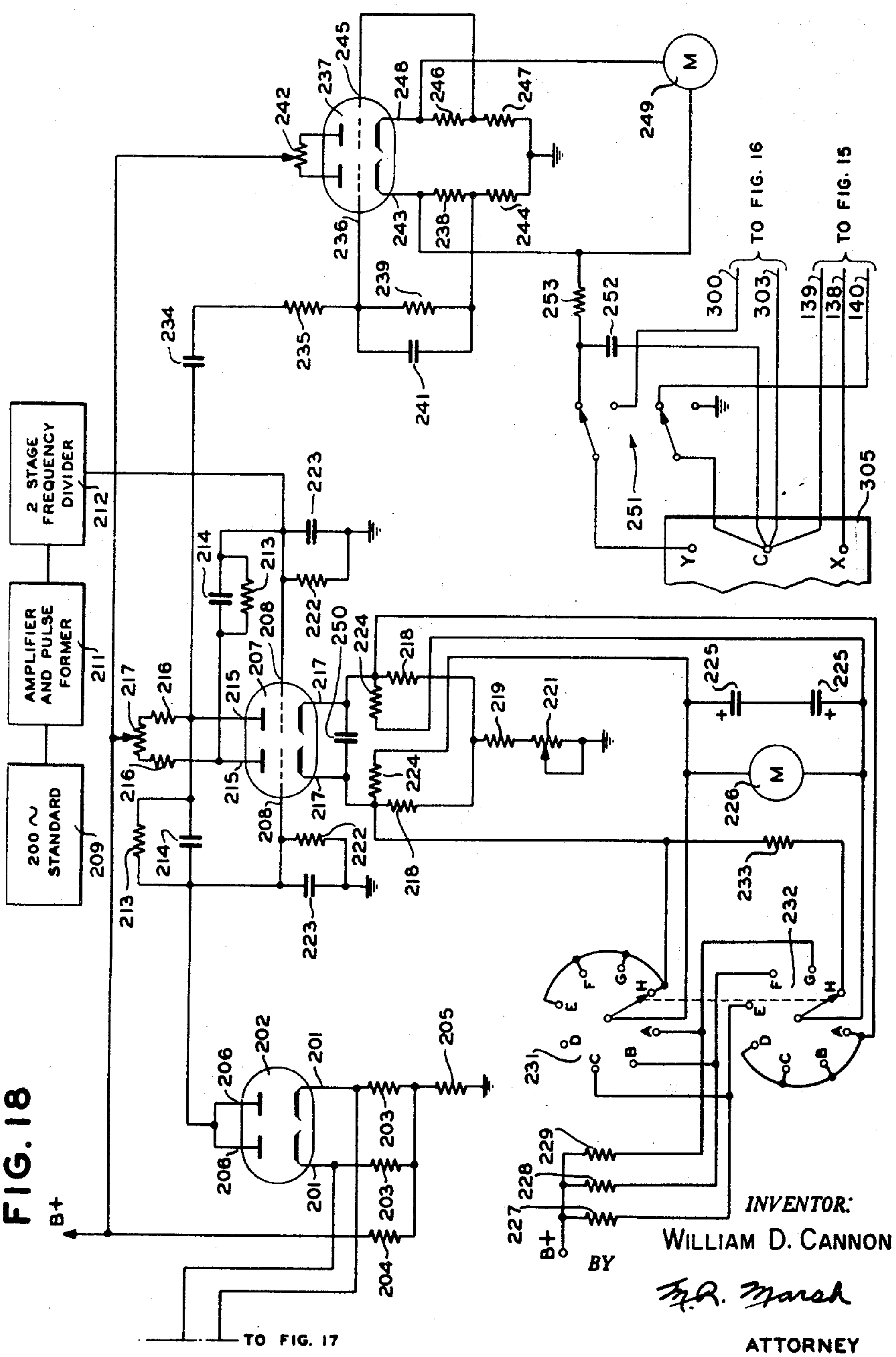

FIGS. 3*a* and 3*b* represent the envelope of a detected wave composed of two slightly separated component frequencies, the wave of FIG. 3*b* being composed of a 50% modulated carrier frequency to produce a carrier and two first order side band frequencies;

FIG. 4 represents the time relationships which exist between signal and reference pulses as applied for comparison purposes to the two grids of a flip-flop circuit;

FIG. 5 discloses the elements of three different basic types of delay compensating networks;

FIGS. 6 and 7 illustrate the circuitry of two practicable network circuits for delay compensation;

FIGS. 8, 9 and 10 are reproductions of photographs of oscilloscope curves representing the delay and amplitude characteristics of typical lines before and after compensation by means of the networks of this invention;

FIG. 11 gives details of the sweeping oscillator section of a beat frequency oscillator used to provide the variable carrier frequency employed for making delay measurements;

FIG. 12 is a schematic wiring diagram of a circuit for correcting irregularities in transmission delay according to the instant invention;

FIG. 13 is a block diagram of an instrument for measuring transmission delay in accordance with the instant invention;

FIG. 14 is a schematic wiring diagram of the transmitter portion of a transmission delay measuring instrument comprising FIG. 13;

FIG. 15 is a schematic wiring diagram of a frequency measuring circuit for use as a part of the measuring instrument comprising FIG. 13;

FIG. 16 is a schematic wiring diagram of a detector circuit for use as a part of the measuring instrument comprising FIG. 13;

FIG. 17 is a schematic wiring diagram of a limiting and pulse forming circuit for use as a part of the measuring instrument comprising FIG. 13;

FIG. 18 is a schematic wiring diagram of a delay measuring circuit for use as a part of the measuring instrument comprising FIG. 13;

FIG. 19 is a diagram illustrating the method of combining FIGS. 15, 16, 17 and 18 for circuit continuity;

FIG. 20 is a schematic wiring diagram of another embodiment of compensating device for use in the assembly of FIG. 12;

FIG. 21 is a wiring diagram of an alternative portion of FIG. 20; and

Figure 22:
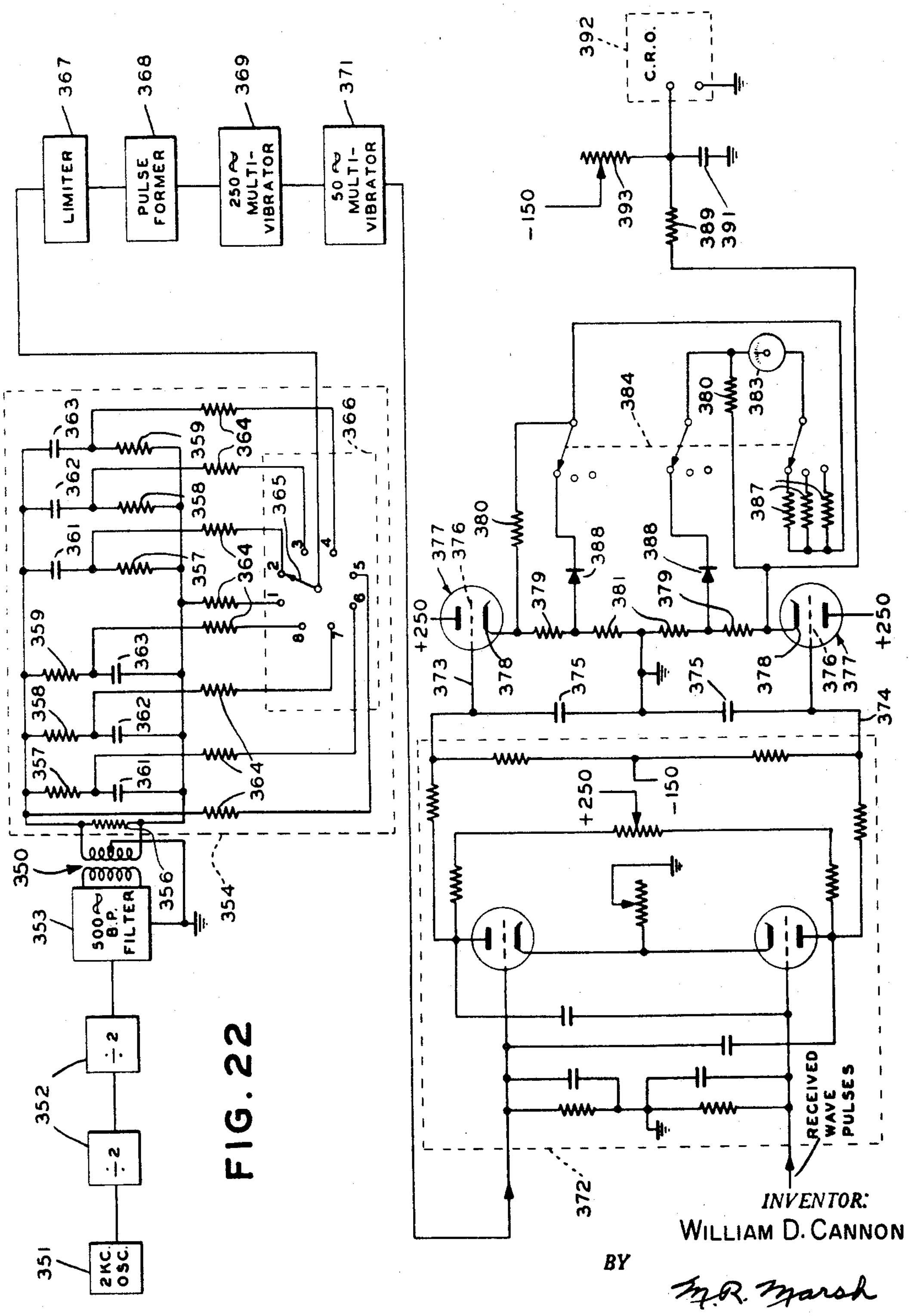

FIG. 22 is a schematic wiring diagram of a different embodiment of the delay measuring circuit from that shown in FIG. 18.

Signals for electrical communication are, in general, transient or repetitive and, as is well known, these transients or repetitive pulses may be resolved into a fundamental frequency and a series of higher harmonics thereof. In a square wave, for example, when transmitted, these frequency components all bear a definite relationship to each other in respect to amplitude and phase, and it is desired that the same wave when received resemble its original configuration within specified limits. However, the attenuation of the transmission medium may vary over the range of these frequencies with the consequence that the shape of the received signal will depart from its original form. Likewise, the transmission time delay may vary over the range of frequencies so that the different frequency components reach the receiver at different instants of time, with the consequence that a still different form of distortion may occur. A study of these types of distortion as produced by transmission media is found in an article by S. P. Mead entitled "Phase Distortion and Phase Distortion Correction," in the Bell System Technical Journal, page 195, volume 7, 1928, and in a second article entitled "Measurement of Phase Distortion," by H. Nyquist and S. Brand, found on page 522 of the same publication, volume 9, 1930.

Proceeding with the examination of transmission delay and the application of the present invention to its measurement and compensation, it is observed that signals involving a relatively wide transmission band, in terms of octaves, are particularly liable to this type of distortion. One exception is the case of telephony where, although the distortion occurs, the reception of telephone sounds is not seriously impaired thereby because of the tolerance of the human ear to this type of distortion. Facsimile signals on the other hand are a type of pulse transmission and are particularly subject to delay distortion especially since, due to the inherent inefficiency of this mode of transmitting intelligence by known methods, it is customary to exploit the available bandwidth of the transmission medium to the fullest extent. The signals, ranging from large areas of solid black on the one hand, to fine lines on the other hand, comprise a frequency range of several octaves and hence if non-linear transmission delay is present in the line or other transmission medium, the received facsimile image will suffer loss of detail, echoes, and other impairment to fidelity of reproduction.

Modern telegraph systems are reaching to higher speeds as the number of channels is increased in multiplex type systems, and also in some types of single channel systems designed to accommodate the high-speed output of business machines. These effects of non-linear delay in the transmission medium upon the transmission of both facsimile and telegraph signals are serious whether or not the signals are transmitted directly as pulses or are modulated on a carrier frequency, but they are particularly serious in the case of direct pulse transmission. In either event, for best utilization of the transmission medium, device or network, it is necessary to identify, measure and compensate to within tolerable limits any non-linearities in transmission delay.

One method which has been commonly used for measuring transmission delay is to send a sinusoidal signal of adjustable frequency over the line, device or network under measurement while sending, as a reference, a second signal of like frequency over a second and distortionless line connecting the same termini and then measuring the phase relationship of the two frequencies at the receiving end. Alternatively, a fixed frequency derived from the same base generator as the measuring frequencies may be sent over the auxiliary channel and various reference frequencies then derived therefrom at the receiving end. By thus measuring delay at a series of frequencies of interest, successively, a plot of the overall transmission delay characteristic can be constructed. It is apparent that such a method is very laborious and risks overlooking intermediate peak aberrations unless the points of measurement are very closely spaced. It is evident further that the conduct of corrective procedures, if dependent upon such a method of measurement, are exceedingly tedious and time consuming. A primary objection to such a method is the requirement of a reference standard of phase transmitted from the sending end of the circuit. Even if a separate channel for this purpose is available, such channel is subject to distortions of its own and if either the circuit under measurement or the auxiliary channel involves carrier transmission, then either or both are subject to frequency aberrations due to nonsynchronism of the pairs of translating oscillators of the carrier system terminals. All of these difficulties have been overcome in the system to be described.

Figure 1:
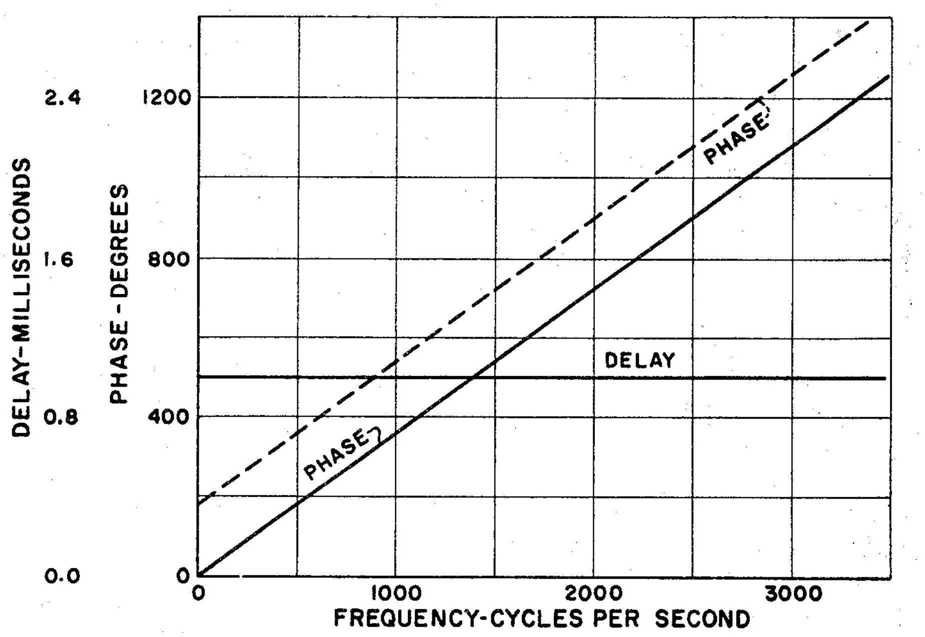
FIG. 1 represents phase shift and delay curves for a line or device having delay linear with frequency.

FIG. 1 is illustrative of a typical delay characteristic of a transmission line. In this case, delay is constant with frequency and signals transmitted over such a line will not be distorted. The slight line phase characteristic, it is noted, terminates at the origin. In the event that the phase characteristic does not pass through the origin as indicated by the dash line, in certain circumstances distortion may occur, but in most cases such distortions are of little consequence and are not dealt with further in this specification.

Figure 2:
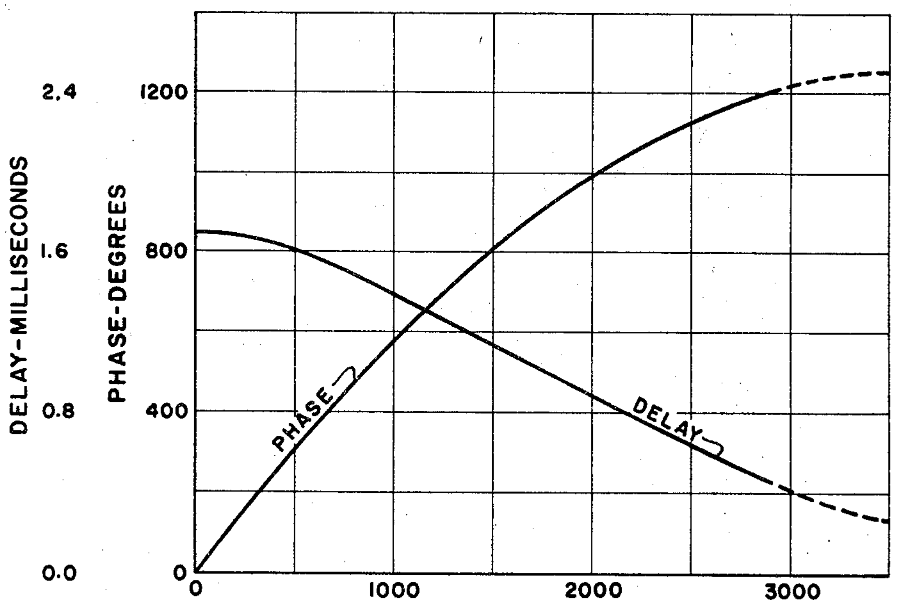
FIG. 2 represents phase shift and delay curves for a line in which these properties are not linear with frequency.

FIG. 2 is similar to the preceding FIG. 1, but the delay and phase curves are illustrative of a line possessing nonlinear delay. The aforementioned paper by Nyquist and Brand examines the case of non-linear delay and suggests a method of delay measurement. If $\beta/\omega$, where $\beta$ represents phase shift and $\omega$ is proportional to frequency, represents the phase shift characteristic of a line, then $d\beta/d\omega$, the first derivative thereof, represents a quantity termed the "envelope delay" for the line. This quantity plays a fundamental part in determining the delay of a system and has the advantage that it is constant for a distortionless system whereas $\beta/\omega$ varies with frequency. It is determined further that envelope delay may be measured directly by transmitting over a line a carrier frequency modulated by a relatively low frequency so that, in effect, the two first order side bands of the transmitted wave comprise two slightly separated frequencies of equal amplitude. The modulated wave envelope suffers no significant distortion regardless of the length of line. For practical purposes, measurement of the delay of this envelope as the pair of sideband frequencies is varied over the frequency range of interest represents the envelope delay of the line.

Under the present invention a sinusoidal carrier of continuously adjustable frequency is amplitude modulated by a signal of relatively low frequency, and this wave, consisting only of the carrier and two first order sidebands, all having nearly the same high frequency, after transmission over the line, is demodulated at the receiving end to regenerate the modulating frequency. By providing, as a reference of comparison, a local generator operating independently of, but at approximately the same low frequency as the modulating frequency a determination of the difference in time of transmission of the regenerated modulated wave for various carrier frequencies is accomplished. This is done by measuring the time interval between the occurrence of corresponding critical points on the locally produced and the regenerated low frequency waves at one carrier frequency, and comparing this interval with that observed at other nearby carrier frequencies.

It can be shown that either amplitude or frequency modulation can be used to derive the three required frequencies. However, at the frequencies involved here, amplitude modulation allows more simple instrumentation and the resulting amplitude modulated signals are more nearly analogous to those used in facsimile and telegraph transmission.

A significant feature of the invention is that the phase relationship which happens to exist between the original modulating wave and the locally generated low frequency comparison wave at the moment of measurement does not affect the accuracy of the measurement, since only time, and not phase, differences are compared. The resulting determination is obtained by direct measurement of time, and for this reason it is unnecessary to lock the local generator into phase synchronism with the transmitted signal, and in fact, a moderate amount of drift in the phase of the locally generated wave can be tolerated during the measurement, provided that it is small in relation to the quantities being measured.

A further advantage attributable specifically to this method of measurement is that delay determinations so made are measured in a direct and linear manner suitable for precise indication or recording, and not in a nonlinear manner such as occurs with phase comparison methods of measurement.

As a result of the wide tolerance of the measuring apparatus toward phase changes of the locally generated comparison wave, one of the important and distinctive advantages of this system arises, namely, that the local generator is independent and free running, and need not be synchronized with the transmitter in either phase or frequency, being required to maintain only a close approximation of the modulating frequency, such as is readily obtained from commercially available signal generating sources. This renders unnecessary the transmission of synchronizing information to the receiving apparatus during the measurement, and results in greatly simplifying the equipment by the elimination of the apparatus components and the auxiliary channel associated with the production and use of such synchronizing signals.

Although the modulating frequency recovered from the demodulated signal is, as stated, a very low frequency, the time delay which it experiences is of the same order as that associated with the much higher frequency of the carrier wave. This is very advantageous for practical reasons, because changes of group delay corresponding to a carrier phase change of many radians if measured at the carrier frequency level is measured by a time delay of less than one repetition period, or half cycle of the modulating frequency so that, except for very long delays, no cyclical ambiguity is present in the measurement of delay distortion when made by the instant method of measuring the delay of the regenerated modulating frequency wave.

My invention concerns itself with the measurement of relative delay rather than absolute delay as being the factor with which we are primarily concerned in the reception of distortionless signals. It is obvious that if all of the components of a signal are delayed alike, the original wave shape will be preserved. The invention, therefore, concerns itself primarily with the measurement of the delay discrepancies which exist among the various components of the signal. Phase delay of transmission media can produce a variety of different forms of distortion involving not only the shift of the cross-over points of harmonic components but also the production of spurious harmonics. However, I have determined that the method of the invention, which provides a measurement of envelope delay also provides a satisfactory measure of phase delay, and that when compensation is carried out as directed by these measurements, that substantially distortionless transmission of the signals follows.

If two sinusoidal waves of slightly different frequencies are propagated over a line having non-linear delay, they will travel at different velocities and will form crests and troughs which will travel at a slightly different velocity from the component waves. The crests thus formed are delayed by the factor $d\beta/d\omega$, commonly referred to as the group or envelope delay whereas the two components are each delayed by the factor $\beta/\omega$. For a distortionless medium, the envelope delay and the phase delay become equal. These observations still apply when three frequencies of an amplitude modulated wave comprising a carrier and two side frequencies are transmitted, and the delay to the modulating wave is still $d\beta/d\omega$. The most important factor to be considered in general is envelope delay $d\beta/d\omega$, and it is not necessary to consider phase shift directly as such. Although a line may not be entirely free of distortion and hence $\beta/\omega$ does not equal $d\beta/d\omega$, it is usually found that when satisfactory correction has been made for envelope delay distortion, then phase delay is also within tolerable limits.

A wave exhibiting the crests and troughs typical of the transmission of two slightly different frequencies over a medium having phase distortion is indicated in FIG. 3*a*. The same wave, produced by 50% amplitude modulation of a carrier, is depicted in FIG. 3*b*. This is the type of signal which I employ for the measurement of relative delay. It comprises two closely spaced side band frequencies and an intermediately spaced carrier at substantial level which may be selected for frequency and level indicator purposes at the receiving end of the medium. After taking a delay reading at a first carrier frequency, a second reading is taken but with a carrier frequency differing therefrom by $\Delta f$. The difference is relative delay, $d\beta/d\omega$, at the carrier frequency.

A simple but extremely effective measuring technique is used for reading delay which comprises the comparison of the time position of the low frequency wave envelope derived from a received modulated wave, with a like low frequency reference wave having substantially the same frequency but of random phase. This independence of initial phase position is an important advantage of the invention rendered possible by the choice of comparison circuitry. The ultimate comparison device is a two-tube balanced bi-stable flip-flop wherein critical points of the received and reference waves are applied, respectively, to the grids of the two tubes and an integrating type DC meter is connected in bridge relationship across the two cathodes. The waves under comparison are applied to the flip-flop grids as uniform sharp pulses which in this case correspond to the zero or cross-over points of the original wave. To assure sharpness and fidelity of spacing of these pulses, the conversion from the original sine wave is accomplished by a square wave converted and limiter followed by a peak producing differentiating circuit.

The reason that the bi-stable flip-flop and integrating meter, with pulse excitation of the grids, has unique application in this instrument is that the meter measures the asymmetry of the alternating dwell intervals of the two halves of the flip-flop, and this asymmetry is a linear measure of the time difference between the two low frequency waves. It is evident that if the exciting pulses applied to the two grids alternate with each other at uniform spacing then the meter must read zero, while departure from symmetry of spacing in either the plus or minus direction will cause an appropriate deflection on the meter.

The ultimate comparison device referred to is found at Q in the overall block diagram, FIG. 13, and in detail in the flip-flop tube 207 of FIG. 18; while FIG. 4 is an explanatory aid for the flip-flop and meter operation. Reference to FIG. 4 will illustrate why when pulses corresponding to critical points of the reference envelope waves are applied to the right hand half of tube 207, while like pulses derived from the incoming envelope wave are applied to the left hand half of tube 207, the meter M connected in bridge relation across the cathodes of the two halves of tube 207 will provide a linear indication of the discrepancies of time occurrence of the alternating critical points of the two envelope waves. In FIG. 4, and forgetting for the moment the outlined sine waves, at *a* the series of negative pulses shown, occurring at the rate of 50 pulses per second, and produced at alternating cross-over points by the pulse former P of FIG. 13 represent the reference wave. The time position of this wave may be regarded as constant, against which the varying time positions of the incoming waves are to be compared. At *b*, *c* and *d*, pulses derived from an incoming 25-cycle wave, after having been subjected to differing delays, are depicted. It will be noted that the received pulses (produced by the pulse former M of FIG. 13 as will later appear) occur 50 times per second and so are directly comparable with the pulses of the reference wave.

At *b*, the received wave is delayed 90°, or 10 milliseconds, and it is evident that since the intervals L and R between cross-over periods of the reference wave and received wave, respectively, are all equal, then the average voltage across the meter must be zero and for this condition the meter will read zero. This follows from the fact that application of a negative pulse to the grid of one tube of a bi-stable flip-flop establishes space current flow, or dwell, in the opposite tube. By adjustment, either of meter biasing circuits not shown, or by adjustment of a phase shift network in the circuit of the reference wave (such as that shown at 354 of FIG. 22) the meter can be set at zero for the beginning of a series of measurements. For the moment assume that the meter is of the zero center type. Now if the received wave encounters delay less than 90°, it will move in the direction indicated at *c*. As will later be described this produces a preponderance of dwell of the right hand half of tube 207 (FIG. 18) and the meter, so connected as to be deflected in the left hand or negative direction, will indicate a delay change of minus 5 milliseconds. On the other hand, assume that as the measuring carrier frequency is swept over the range, the amount of delay increases and the received wave moves in the direction shown at *d* in comparison with the reference wave. The left hand half of tube 207 now experiences a longer dwell and the meter will move to the positive portion of its scale, to indicate delay of plus 5 milliseconds.

Since ambiguity exists at the two full scale readings, it is generally desirable to choose conditions of measurement such that extremes of the scale are not reached. This factor will be considered later in the discussion of the meter circuitry of FIG. 18. If desired, at the beginning of a series of measurements the meter reading can be brought to zero by an initial shift of the random phase relation of the reference wave. This, then, is the reference level of delay for the beginning carrier frequency located as desired, say at the lower edge or at the center of the band under measurement. Then, as the carrier is swept over the band, the delay is measured for each frequency relative to the arbitrarily chosen beginning frequency and delay reference level. The adoption of a delay reference level is entirely a matter of convenience because with the disclosed method the measurement is linear whether the asymmetry is large or small. Precise identity of the two low frequencies, their synchronism or their initial phase position are unimportant. Due to the stability of practically available fork generators, the short time drift between the received and reference frequencies does not influence the readings.

A number of meter adjuncts are possible. By means of a suitable biasing circuit, the zero point of the meter, which would normally lie at mid-scale, can be moved to one end of the scale. Also, as previously mentioned, the maximum range of the meter is equal to the time length of one half-cycle of the wave envelope which in the case of 25 cycles is 20 milliseconds and, by additional circuitry, this range has been extended. By means of an additional stage of amplification, a meter bearing an expanded scale is also accommodated.

As previously stated, in this instrument the phase comparison is reduced to a measurement of time, that is, the intervals between discrete, short marker pulses, and hence is virtually independent of imperfections in received wave shape and noise as well as momentary synchronism and phase relation between the received and reference frequencies. Compare these basic advantages with the limitations of prior art systems which relied upon devices for comparing the phase of sine waves with their requirement of vector addition with its non-linear relationship between phase and time so that the two waves must not only be in synchronism but the reading devices must either compensate for the non-linear phase-time relationship or supplemental calculations must be made.

Returning to FIG. 4, since waves have been drawn into the rows of pulses *a*, *b*, *c*, *d*, in part to clarify the relationship of the reference and received waves and also to illustrate the problem which would present itself if the two waves were directly compared in some type of differential phase sensitive device as is customary in other types of delay measuring instruments. Obviously for a given degree interval, or time period, a sine wave undergoes a different amplitude change depending upon the position of the chosen interval along its course. For example, beginning at 0° on a sine wave, a 10° interval represents an amplitude change of 17% whereas at 90° the same interval represents only a .016% change. Consequently, in this type of phase comparer, only like parts of the changing received wave may be compared with the identical part of the reference wave; hence the requirement for continuous synchronism of the received and reference waves in these earlier types of instruments.

In contrast, the extraordinary utility of this invention is apparent from the fact that time intervals rather than wave amplitudes are being compared and it is of no consequence whether the two waves are at crest or trough or any other position with respect to each other. This avoidance of a need for synchronism and the maintenance of a known phase position lead to the design of a relatively low cost instrument for measurement of time delay of lines of any length and with isolated terminals whereas in the past such measurements were laboriously made only with great difficulty and expenditure of time by highly skilled personnel using a costly assemblage of equipment. The many-fold increase in speed of measurement permitted hereby especially adapts the instrument for corrective procedures using my novel delay compensating networks described elsewhere in this specification. Through a step-by-step procedure of alternating delay measurement and network readjustment, a line equalization task which formerly consumed days or weeks of time can be accomplished with the aid of the invention in a matter of hours.

Moreover, if the carrier frequency is swept repetitively through the frequency range of interest, at a uniform rate, while the delay meter current is applied to the vertical pair of plates of a cathode ray oscilloscope which has its horizontal pair of plates energized by a second signal derived from and proportional to the sweeping carrier frequency, then the oscilloscope will delineate a plot of signal delay against frequency.

Such displays are illustrated in FIGS. 9 and 10 and constitute an instantaneous and direct picture of the delay characteristic of the line through the frequency range of interest and are suitable for observing the effect of compensating equipment adjustments as they are being made, and without further analysis being required.

In devices intended for measurement or other purposes which employ the principle of comparing time or phase relationships of frequencies, the stability of the two frequencies under comparison is highly important. Preferably the peaks of the waves would be chosen as the comparison points but they are difficult to sense accurately. Instead it is customary to use as comparison points the instant of cross-over of the zero axis by the respective waves. These points again are subject to erraticities unless special precautions are taken to avoid them. These difficulties are overcome in the present invention by expedients now to be described.

In the limiter and pulse former of FIG. 17, which comprise the blocks K and M of FIG. 13, the early stages clip the incoming wave at levels lower than that chosen for the subsequent stages. By this expedient the received wave is amplified in each of the stages beyond its clipping level so that a substantial measure of wave squaring is accomplished in each stage whereby at the output of the final stage a virtually square wave, symmetrical with respect to the zero axis, is achieved. By thus maintaining symmetry the phenomenon termed herein "axis shift" is almost entirely eliminated. Elimination of axis shift is furthered by the choice of the comparison frequency presented to the delay measuring flip-flop. Instead of 25 pulses per second corresponding directly to the frequency of the received envelope, 50 pulses per second are used for comparison with a 50 pulse per second reference rate generated by the fork at the receiver.

In explanation, it is apparent that if the amplitude of the 25 cycle wave shifts upward or downward with respect to its zero axis as a consequence of changing line attenuation, the positive and negative half waves lose their symmetry and become unequal in length. The time position of any individual cross-over, therefore, would not be representative of the actual line delay. However, by sensing each cross-over the respective long and short half waves are averaged to give an effective reference point truly representative of the arrival time of the wave. This reference point is in effect equivalent to the peak points of the positive and negative half waves. By this expedient the final delay readings are uninfluenced by amplitude changes of as much as 40 db.

Little has been said up to this point about the facility included in the measuring instrument for the measurement of frequency. Since frequency comprises the abscissa in the customary delineation of delay curves, an accurate, automatic and continuous means of measuring frequency must accompany the similar measuring facility for time delay. For this purpose, I include a frequency indicating device, preferably of the counter type, which responds to the carrier component of the modulated received wave. Hence, at any instant, the operator can properly coordinate measurements of time delay with frequency. The frequency meter circuit is extended to the horizontal pair of plates of an oscilloscope whose vertical pair of plates is connected to delay meter. With this arrangement, a continuous delineation of the delay-frequency measurement of a line or device may be presented, and this is particularly helpful in the process of delay equalization.

It is well known, of course, that non-linearity of attenuation with frequency is also a cause of distortion of signals. In order to measure the frequency-attenuation characteristic, it is a fairly simple matter to connect a level meter in the receiving circuit in advance of the limiters and to observe the level of the incoming wave as its frequency is swept over the region of interest. In the same manner as outlined for recording delay measurement, the level meter may be connected to the vertical pair of plates of an oscilloscope for delineating frequency-attenuation curves.

The measuring instrument, therefore, lends itself uniquely for use in programs for coordinated correction of the delay and attenuation factors principally responsible for causing distortion in signals. Particularly adapted for this purpose are the compensating networks, to be described later, designed to correct non-linearity in both delay and attenuation.

*Delay compensating networks*

When a transmission line network or device has been found to possess irregular delay over its useful frequency range through measurement with a delay measuring instrument such as described in the foregoing, the distortion to signals which follows may be eliminated through the addition of delay compensating networks to the system under measurement. The purpose, of course, is to linearize a non-linear phase shift characteristic such as has been indicated in FIG. 2. When corrected, the delay and phase shift curves of this figure will resemble those of FIG. 1 except that the phase shift curves probably will not pass through the origin. Since it is not possible to introduce negative delay, the compensation is effected by introducing positive delay in suitable amounts at those frequencies which suffer least delay when transmitted over the line or network.

While there are many types of delay compensating networks, I have found that a species of bridge type network which may be used singly, or in tandem, but preferably with a gain element such as a vacuum tube or semi-conductor amplifying device, interspersed between sections for the purpose of recouping the attenuation loss imposed by the networks. Each network is effective over a relatively narrow range of frequency and it is convenient to employ as many as a dozen or more such networks in series to cover a frequency band of several kilocycles. Each network introduces a resonance like curve in the delay characteristic so that, when properly spaced, a series of such curves tend to merge together to form a final relatively flat overall compensated characteristic. The residual peaks of the resonance like curves may readily be kept within the required delay tolerances for the system.

The bridge networks comprise a pair of ratio arms usually fixed and usually of non-unity ratio, and a second pair of arms, at least one of which includes one or more reactances, usually a resonant circuit and possibly with a damping resistance, while the fourth arm usually comprises a variable resistor. A large number of permutations of these elements are possible depending upon the manner in which the network is to be used, the nature of the circuit characteristic being compensated, the terminal equipment and the type of associated amplifying device. These practical considerations favor a few generalized types, three of which are illustrated at *a*, *b* and *c* in FIG. 5. In each of these, an impedance transformation between input and output occurs so that the networks complement the opposite impedance transformations which occur in most amplifying devices thus permitting convenient coupling to preceding or following amplifying devices.

In FIG. 5(*a*) is shown a constant voltage network arranged for low impedance input and high impedance output. As indicated, the input voltage is applied by means of a transformer bearing an intermediate tap to provide a non-unity ratio input designated by the factor K. Generalized impedance arms $Z_a$ and $Z_b$ are shown in the opposed bridge arms. FIG. 5(*b*) presents a constant current type of network embracing a high impedance input and a low impedance output. The input current may be applied from a suitable transformer, or by direct coupling, as may be convenient. In this network all four arms of the bridge can be made adjustable in pairs. In the constant current network of FIG. 5(*c*) a high impedance input and a low impedance output are again characteristic. This network includes two fixed resistance arms bearing the ratio $R3/R4=K$.

In each of the above networks, connections to ground have been indicated, but it should be understood that these are entirely optional depending upon the requirements of the associated circuitry.

In order to bring out the unique performance of certain circuit combinations when embodied into these network configurations, an analytical presentation follows. In the network of FIG. 5(*a*) the output-to-input transfer ratio is of the form $$E_2/E_1=\frac{KZ_b-Z_a}{Z_a+Z_b} \quad (1)$$

where $Z_a$ and $Z_b$ are functions of $\omega$, $2\pi f$, and the parameters of the network elements shown at $Z_a$ and $Z_b$, while K is a proportionality factor. The factor K may be real or complex, but only real numbers will be considered here.

For $K=3$, Equation 1 can be satisfied by the use of a resistance for $Z_a$ and a resistance R and reactance X in parallel for $Z_b$ so that $$\frac{E_2}{E_1}=\frac{2jX-R}{2jX+R}$$

and $$\beta=2\tan^{-1}\left(-\frac{2X}{R}\right) \quad (2)$$

where $\beta$ repesents phase shift.

For $K=5$, the conditions can be satisfied by resistance and reactance combinations for $Z_a$ and $Z_b$ such as $$Z_a=R_1+jX_1;\text{ and } Z_b=\frac{jMR^2X}{R^2+jMX} \quad (3)$$

where M is a constant. Of these, a very useful form occurs when $M=1$ and $R_1=R_2=R$ in which case the output-input transfer ratio is $$\frac{E_2}{E_1}=\frac{3jRX-(R^2-X^2)}{3jRX+(R^2-X^2)}$$

and $$\beta=2\tan^{-1}\left(\frac{-3RX}{R^2-X^2}\right) \quad (4)$$

A simple and practical network type is shown in FIG. 6, which is analogous to FIG. 5(*a*) previously considered. In FIG. 6, from Equation 4 above $$\beta=2\tan^{-1}\left(\frac{-3\omega RC}{\omega^2R^2C^2-1}\right) \quad (5)$$

so that for a given frequency and fixed value of C a phase shift reaching approximately from 0° to 360° is obtained with constant amplitude throughout the range merely by simultaneously varying the two equal resistors R.

A network according to FIG. 7 has been found highly useful. In FIG. 7, $R_1$ is used for $Z_a$, and for $Z_b$ the three-element parallel combination L, C, $R_2$ is inserted. The K factor is provided by the ratio $R_3/R_4$. If $R_1$, $R_2$ are maintained equal throughout their range of adjustment, the amplitude characteristic will remain constant, while from Equation 2 the delay characteristic will vary according to $$\beta=2\tan^{-1}\left(\frac{-2\frac{\omega}{\omega_0}\sqrt{L/C}}{R\left(1-\left[\frac{\omega}{\omega_0}\right]\right)^2}\right) \quad (6)$$

where $\omega$ corresponds to the frequency under measurement, as before, and $\omega_0$ corresponds to the resonant frequency of the parallel resonant combination L and C.

If, in addition, it is desired to produce a variable amplitude characteristic by the network of FIG. 7, this can be accomplished by offsetting resistor $R_2$ with respect to resistor $R_1$. In this case the output-input transfer ratio and delay can readily be shown to be $$\frac{E_2}{E_1}=\frac{jX(3R_2-R_1)-R_1R_2}{jX(3R_2+R_1)+R_1R_2} \quad (7)$$

and $$\beta=\tan^{-1}X\left(\frac{R_1-3R_2}{R_1R_2}\right)+\tan^{-1}-X\left(\frac{R_1+R_2}{R_1R_2}\right) \quad (8)$$

where $$X=\frac{\omega/\omega_0\sqrt{L/C}}{1-(\omega/\omega_0)^2}$$

If $R_2$ is larger than $R_1$, the amplitude characteristic, from Equation 7, will be peaked upward in the vicinity of the resonant frequency $\omega_0$. If $R_2$ is smaller than $R_1$ it will be peaked downward.

Reference has previously been made to the ratio factor K and the preference for the values of 3 and 5 for this factor. It has just been proved that it is characteristic of the networks of FIGS. 5 and 6 that by choice of the parameters of the impedances $Z_a$ and $Z_b$ a value of K of either 3 or 5 may be achieved. It is further characteristic of networks with K equal to 3 that the delay and amplitude characteristic may be adjusted separately and independently. This property, unique in the networks described herein, is of extraordinary practical importance. Its origin rests upon the phase shift Equation 8 previously asserted where it is apparent that phase shift comprises the sum of two factors each of which differs only in that the numerator is in the one case the sum of the two resistances $R_1$ and $R_2$ and in the other case the difference of these two resistances. Hence while adjusting the delay characteristic of the network by varying $R_1$ and $R_2$, if the resistors are maintained equal the delay characteristic will be dependent upon their common value while the amplitude characteristic will remain constant for all settings. If, in addition, it is desired to vary the amplitude characteristic this can be accomplished by offsetting resistor $R_2$ with respect to resistor $R_1$ and the delay will remain substantially constant inasmuch as while one term of Equation 8 declines, the other will rise in compensating degree.

The network of FIG. 7 has been found to be a particularly useful form of $K=3$ network. The K factor is obtained by the ratio of the resistors $R_3/R_4$, where the value of the resistance of $R_2$ is in fact the combined resistance of $R_2$ and the resistance of the paralleling coil L.

The values of $K=3$ or 5 are somewhat unique but the utility of the networks described herein is not limited precisely thereto. It is of considerable practical convenience if, for example, the two adjustable resistors of FIGS. 6 and 7 can be ganged together for simultaneous and equal adjustment. However, K may be varied within a moderate range to accommodate inequalities between the two adjustable resistors, introduced for purposes of attenuation adjustment, with only minor limitation in range of usefulness of the networks. The relationship between $R_1/R_2$ and K, or $R_3/R_4$, in FIG. 7 may be developed from Equation 7 if the symbol K is substituted for the numeric 3 therein. The righthand term of Equation 7 is in the form $$\left(\frac{A-jB}{A+jB}\right)$$

for an all-pass network wherein the real and imaginary terms in the numerator are, respectively, equal to those in the denominator. Then, equating the imaginary terms it is found that:

$$jX(KR_2-R_1)=jX(R_2+R_1)$$

and $$\frac{R_1}{R_2}=\frac{K-1}{2}=\frac{1}{2}\left[\left(\frac{R_1}{R_4}\right)-1\right]$$

Hence, as previously noted, when $$R_3/R_4=3, \text{ then } R_1=R_2$$

and when $$R_3/R_4=5, \text{ then } R_1=2R_2$$

For $K=3$ or 5, attenuation remains small and constant, even when using small and moderate quality coils for the inductors. While the ratios may vary by as much as 25% without severe impairment, departure beyond this amount is likely to introduce attenuation loss beyond that which can readily be regained by a single stage of amplification.

Thus with these $K=3$ networks it is possible to adjust the delay characteristic over a wide range and the amplitude characteristic over a somewhat restricted range essentially independent of each other merely by adjusting two resistors while maintaining a proper relationship between them in accordance with Equations 7 and 8. Practically, it is usually necessary to change only $R_2$ from equality with $R_1$ to change from a flat amplitude characteristic to a peaked characteristic in the vicinity of $\omega_0$. Such convenience is not possible with passive networks which usually require separate networks for amplitude and delay distortion correction since each alteration of the amplitude characteristic of a purely amplitude corrective network introduces some delay distortion which in turn must be offset in the delay corrective network. For this reason, amplitude distortion correction is usually made first. With the $K=3$ active, network, both processes proceed simultaneously using only a single network.

A network type which lends itself uniquely to the $K=5$ ratio is that of FIG. 6. In this simple configuration simultaneous adjustment of the ganged resistors R is obtained through a range of 0° to 360° while maintaining constant amplitude. The $K=5$ networks permit wider variations of delay but do not allow as extensive manipulation of attentuation values as is the case with the $K=3$ networks. In general, the latter type is more useful.

FIGS. 8, 9 and 10 are illustrative of the type of characteristic, both delay and amplitude, obtainable with the active type networks. FIG. 8 presents photographs of two oscilloscope faces, the upper one presenting the delay characteristic obtainable with an active network such as that of FIG. 7, while the lower face is representative of the amplitude correction which may be inserted at the same time by the same network. The delay curves are displaced vertically with respect to each other in order to illustrate the type of peaking which may be obtained. The amplitude curves all correspond to the intermediate delay curve and, as shown, may be either flat, or peaked upward or downward.

These networks are not only useful for correcting regular or random delay and amplitude aberrations but they may also be employed for simulating various amplitude distributions at an essentially constant delay. For example, a filter to accommodate vestigial sideband operation, usually subject to serious delay distortion, may be simulated with constant delay throughout the effective bandwidth. FIGS. 9 and 10 illustrate similar oscilloscope photographs representing the delay and amplitude characteristics of a loaded cable circuit having the approximate bandwidth of 300 cycles to 3500 cycles, before and after correcting, respectively, by means of the compensating networks of the invention. In this case, a series of active networks in tandem were individually adjusted while observing the effect of the adjustments by means of the hereinbefore described measuring system. It will be noted that a relatively flat delay characteristic over the complete range has been realized. By means of the same networks, a relatively linear but, in this case, slightly rising attenuation characteristic has been obtained. The results shown in these two figures are but illustrative and it should be realized that by proper network adjustment, a great variety of characteristics may be obtained by the use of a single type of network. It is obvious also that since the overall curves comprise an addition of the plurality of peaked component curves, then smoothness of the final curves will be somewhat proportional to the total number of network sections employed.

*Operation of delay measuring instrument*

FIG. 13 presents an overall block diagram of the measuring system as arranged for making delay measurements on a line where the two terminals are isolated from each other. The transmitter section comprises essentially a source of variable carrier frequency, a highly stable source of a relatively lower modulating envelope frequency, and a modulator. The receiver includes, essentially, a demodulator for the envelope modulated incoming carrier frequency, together with associated amplifying, limiting and pulse forming circuits for furnishing to the flip-flop comparison device a series of pulses representative of the time of arrival of the envelope waves. For comparison, or reference, purposes in the flip-flop, a similar series of pulses is obtained from a frequency standard and associated apparatus, parts of which may be identical with that employed at the transmitter. The output from the flip-flop may operate directly a coarse delay meter for indicating the envelope delay at the carrier frequency under measurement. At the same time, a frequency meter, energized from the receiving amplifier, provides a continuous indication of the momentary carrier frequency, while a level meter included at the output of the demodulator presents a continuous indication of received carrier frequency level. The coarse delay meter is particularly useful for measuring wide range areas of delay and for general monitoring purposes. For more sensitive indications, a high sensitivity meter, with an appropriate amplifier, is added. For oscilloscopic presentation, the operating potentials for the high sensitivity delay meter and the level meter may be connected alternatively to the vertical deflection plates of the oscilloscope, while the frequency potential is connected to the horizontal plates. A more detailed description of the overall system of FIG. 13 follows.

From a tuning fork frequency standard A, a frequency of 200 cycles per second is fed to an amplifier and pulse former C producing a continuous pulse train having a repetition rate accurately maintained at 200 pulses per second. This enters an aperiodic divider chain D of three stages composed of bi-stable circuits, and emerges as a train of rectangular waves having a repetition rate of 25 pulses per second. In an integrating amplifier E, these are converted to triangular waves, which, when applied to a parallel circuit resonant at 25 cycles per second, cause the production of a substantially sinusoidal modulating voltage at 25 cycles per second having a high order of frequency accuracy and stability.

Simultaneously with the foregoing, a beat frequency oscillator F produces a carrier signal of relatively higher frequency, and the frequency of the variable frequency oscillator thereof is swept repetitively through a selected frequency range by a motor, to comprise in its entirety a sweep oscillator, for providing a carrier frequency swept linearly over a selected frequency range to be measured.

The 25-cycle voltage and the swept carrier frequency signal are applied to a modulator G so arranged as to provide an output amplitude modulated to the extent of about 50% but to substantially suppress the 25-cycle modulating voltage and all other modulation products except the carrier and first order sidebands. The output signal comprising the carrier and upper and lower sidebands is then applied through a level adjusting and impedance matching attenuator pad H to the transmission line L which it is desired to investigate.

At the distant end of the line the received 25 cycle modulated carrier is applied to an amplifier I which feeds a demodulator and sharp band pass filter J for recovery of the 25-cycle modulating signal, which, due to its passage along the line in envelope form, has suffered a delay identical to that experienced by the carrier frequency under consideration, but more readily measured, as previously explained. Passing to a limiter K, noise and level disturbances are therein eliminated from the signal and it is applied to a pulse former M for the generation of a succession of reception pulses having a pulse rate of 50 per second with their occurrence precisely timed at a selected and distinctive portion of the regenerated modulated wave, in this case the zero or cross-over point.

Concurrently with the above receiver operation, a local tuning fork oscillator B adjusted closely but not necessarily precisely to 200 cycles per second supplies an amplifier N, divider O and pulse forming circuit P to provide a reference standard signal of 50 pulses per second, which, together with the aforesaid reception pulses, are supplied to flip-flop circuit Q. The generator of the receiving-end reference pulses may be identical with the 25-cycle generator as used in the transmitter except that the 50-cycle frequency is procured from an earlier stage of the divider. In fact, if both terminals of the device under measurement were available at one location, a single frequency standard could be used for both the transmitted and reference waves. This facility can lead to economy of equipment for certain measuring assignments, and also influences the packaging of the associated equipment assemblies and their power supplies.

The operation of the flip-flop to compare the time occurrence of the pulses derived from the incoming envelope wave with locally generated reference pulses, both at the rate of 50 per second, to produce an output voltage for the coarse delay meter indicative of envelope delay has already been explained in detail in connection with FIG. 4 and need not be repeated at this point.

For more accurate measurement of delay, this flip-flop voltage is also applied first to an amplifier S, and thence to a high sensitivity delay meter T having means for electrical zero suppression and provided also with a scale selective switching network. Carrier frequency is measured by passing received signals from the receiving amplifier I through a limiting circuit and integrator U to remove the effects of modulation and to provide a voltage proportional to carrier frequency, which is applied to a voltmeter V for indication of frequency. A carrier frequency level meter Z may be connected at any suitable point as at the demodulator J.

For visual display the carrier frequency voltage may be applied to the X-axis amplifier of a cathode ray oscilloscope W, and when the aforesaid delay signal is applied to the Y-axis, a presentation of delay time as a function of carrier frequency, in Cartesian coordinates, appears on the luminous screen thereof. In the same manner, curves of level versus carrier frequency may be portrayed on the same or a second oscilloscope.

This instrument measures the first derivative $d\beta/d\omega$ of a signal envelope, which in the present case is composed exclusively of a carrier frequency and only two symmetrically spaced side frequencies. It has been proved that for such a modulated wave $d\beta/d\omega$ is a measure of the tendency of a line to produce delay distortion in facsimile or other signals of like character, and further, in the distortionless case only, that $d\beta/d\omega$ of the modulated envelope is equal to the phase delay $\beta/\omega$ of the above mentioned carrier frequency. Hence for all practical purposes the $d\beta/d\omega$ oscilloscope tracing represents the relative delay characteristic of the line under test over the swept frequency range, and corrections designed to render this characteristic constant over the desired frequency range will free the line of the tendency to produce phase distortion in signals.

As the oscilloscope spot is impelled across the screen by the gradually sweeping carrier frequency it in effect traces a continuous series of points, the heading of each successive point upward or downward being indicative of the rate of change of envelope delay, with respect to the change in carrier frequency, encountered in the line since the point last preceding was recorded. If the scope beam was interrupted at frequent but regular intervals the resulting curve would correspond to a point-by-point curve taken by hand methods. At a rapid rate of sweep the effective fictitious recurring frequency of the points is relatively coarse. At the slow rate the point frequency becomes fine and the delineation of curves having sharp peaks is feasible.

*Detailed description of the circuits*

The detailed operation of the circuits, beginning with FIG. 14 comprising the transmitting portion of the measuring equipment, is as follows:

*Transmitting portion*

A 200-cycle per second tuning fork standard of frequency 3, of any well-known but very high stability type, supplies a signal to an amplifier and pulse forming circuit 4, which produces one pulse per cycle to drive a three-stage frequency dividing and square wave producing generator 5, in a manner usual in the art. Alternatively, the frequency standard of extraordinary stability with associated divider system, as described in my co-pending application, U.S. Ser. No. 727,354, filed Apr. 9, 1958, now Patent No. 2,998,576, and indicated schematically herein in FIG. 40, may be substituted to advantage for this modulating frequency source. Square waves from the producer 5, indicated as a signal balanced to ground from the output plates thereof, are applied through the coupling condensers 6, to balanced integrating circuits comprising series resistors 7 and shunt condensers 8 to ground, the triangular wave produced thereby being applied to the parallel resonant circuit comprising condenser 9 and inductance 10, which is tuned to resonate at the fundamental frequency of the said triangular wave or 25 cycles per second, to thereby produce a 25 cycle sine wave. This 25-cycle sine wave is then applied to the grids 11 of an amplifying duplex vacuum tube 12 under control of grid leaks 13 and common cathode bias resistor 14. The amplified output from the push-pull connected plates 15 is fed to transformer 16 whence a portion thereof, from the voltage divider comprising the resistors 17 connected across the output of the said transformer, is applied in balanced fashion to the two grids 19 of the duplex triode modulating tube 18 by introducing it at the center tap of the modulation transformer 20. Fixed bias for the cathodes 21 is provided by and the balance thereof to ground is achieved with the aid of adjustable potentiometer 22.

The purity and identity of the 25-cycle sinusoidal waves as generated and the 25-cycle envelope as transmitted herein importantly influence the accuracy of delay measurement. Hence this modulator is of a design which suppresses the modulating frequency and the higher order modulation components to a very high degree so that the 50% modulated output wave consists virtually solely of the carrier wave and the two first order sidebands spaced, respectively, 25 cycles above and below the carrier. While the modulator employing the twin triode tube 18, with circuitry as shown, meets these requirements satisfactorily, an alternative employing two remote cut-off pentodes instead of the twin triode 18 and having a much higher plate resistance also permits modulation at the high level desired without the introduction of significant harmonic distortion into the modulated wave. In this latter case, each half of the primary winding of the line transformer should preferably be shunted by resistances of the same order as the transformer primary impedance so that changes in plate impedance of the pentodes would have but small effect on the ultimate output impedance and hence provide a more constant output level to line.

The beat frequency oscillator 49 comprises two beating oscillators 23 and 33 each having a frequency in the neighborhood of 150 kc. and which may be virtually identical except that the tuning condenser of the tank circuit of oscillator 23 is arranged to be varied repetitively by a motor to provide the desired frequency sweeping action, while in oscillator 33 this same condenser, while normally fixed, may manually be given a number of different settings to determine the position of the swept band.

The schematic circuitry of the variable oscillator 23 is shown in FIG. 11. This oscillator, of known type, has extraordinary frequency stability and constancy of output level over the sweep range. A twin triode tube 50 is employed and the generated frequency is determined by the tank circuit 51 embracing an inductor 52 and tuning condensers 53 and 54. Condenser 53 is relatively large so that as the smaller condenser 54 is varied through its range, the sweep-frequency rate will be substantially linear. Condenser 54 is not only variable in capacity, but its maximum capacity may be given different settings so that the swept band may be located in different areas of the total spectrum over which measurements are being made. These settings are accomplished by mechanically varying the spacing between condenser plates. The sweep has a repetitive triangular pattern such that the output frequency increases to its upper limit on one-half of the revolution of the rotor and then descends at the same rate to the bottom frequency. This avoids sudden large changes in the sweep frequency with consequent disturbance to the measurement section of the instrument.

The low end of the sweep range is set by adjustment of the analogous condenser 54 in the fixed frequency oscillator 33 so as to establish a minimum frequency separation between the two oscillators thus providing an independent means for establishing the low end of the sweep range. The high end of the sweep range depends upon maximum capacity, that is, the distance setting between the plates of the sweep condenser 54 in the sweeping oscillator. Thus, both ends of the sweep range may be set quickly and independently wherever desired without the need of a trial and error process. Output of the variable oscillator is then fed to the secondary center tap of the transformer 30 of the modulator via series condenser 26 and shunt resistor 27, while the output of the fixed oscillator 33 is fed to the primary of transformer 30 of the same modulator.

The signal from oscillator 23 is applied symmetrically to the center tap of the secondary of modulation transformer 30, which is shunted by the matched resistors 28, and thus to the grids 31 of the duplex triode modulator tube 32. Variable oscillator frequency is thus mixed in the tube 32 with constant frequency oscillations from fixed oscillator 33, applied by transformer 30 to the grids 31 of the tube 32. The output thereof is taken from the plates 34, while appropriate adjustment of balancing potentiometer 36 provides for differential trimming of the cathode bias developed in resistor 37 to adjust balance of the two halves of tube 32. Series inductors 38 and shunt condensers 39 working into shunt resistor 41 provide low pass filtering for the modulated output of tube 32, and the balanced series resonant circuit comprising condensers 42 and inductors 43 further suppress the two mixing frequencies and unwanted modulation products to insure that only a pure carrier frequency signal, swept as desired, will be applied to the matching transformer 44. Such signal is applied through the modulation transformer 20 to the grids 19 of the modulator tube 18, and the output thereof is modulated by the aforementioned modulation frequency signal from transformer 16.

The resultant signal, comprising the periodically swept carrier, with associated first order sidebands, therefore, furnishes for ultimate use at the receiving end of the system a pair of sideband frequencies with fixed close spacing for the determination of delay while the intermediate spaced carrier indicates the instant frequency at which measurements are being made, all as will appear hereinafter. This signal is then fed from the plates 46 through the matching transformer 47 to the conventional attenuator and line termination pad 48, and thence to the transmission line under investigation.

Throughout the equipment, vacuum tube cathodes are rendered emissive by heaters having conventional circuitry, which for the sake of clarity is not shown on the drawings, and the positive pole of a grounded, preferably electronically regulated source of potential is applied to the circuit points marked B+.

*Receiving portion*

Detailed circuit diagrams of the receiver are shown in FIGS. 15, 16, 17 and 18 which may be connected together as indicated in FIG. 19. FIG. 16, to be taken up first, shows the receiving terminating equipment for the line under investigation and includes, in order, a balanced level adjusting potentiometer, amplifier, demodulator and 25-cycle filter of the active type. The aforementionel level meter is shown connected across the demodulator output. The line terminates in transformer 51, and ganged attenuators 52 across the balanced secondary winding thereof apply the received signal from the line to the grids 53 of the duplex triode push-pull amplifier tube 54. Resistor 56 in the common circuit of cathodes 55 supplies grid bias to the tube 54. Plates 57 and 58 are connected to energize the primary of output transformer 59, while a direct connection to plate 57 is extended to the circuit of FIG. 15 for providing amplified received signals for the measurement of carrier frequency.

The secondary winding of output transformer 59 energizes a demodulator comprising four rectifiers 61 operating as a diode bridge to produce an output across load resistors 62 and 63 in series, and having a level measured by the meter 64 in series with the multiplier resistor 65, which, with the carrier frequency component attenuated by the filter comprising resistor 66 and condenser 67, is led through coupling condenser 68 and isolating resistor 69 to a vacuum tube type of filter comprising tubes 73, and 85, and the bridged-T network 76–82. An appropriate portion of the unfiltered wave is withdrawn across the load resistor 63 through the resistor 301 with shunting condenser 302 for purposes of oscilloscopic volume level indication via lead 300, as explained at greater length in connection with FIG. 18.

Demodulated wave potential at 25 cycles is supplied by resistor 69 to the grid 72 of duplex triode 73 and an output signal is withdrawn from the cathode 70 thereof, across cathode resistor 74, supplied to grid 75 of the triode amplifier comprising the remainder of tube 73, through the coupling condenser 95, and also supplied at an advantageous low impedance level to the bridged-T 25-cycle blocking filter network comprising resistors 76, 77, 78 and 79, and condensers 80, 81 and 82. Resistor 79 is variable, for fine tuning purposes. The output of the bridged-T network, which comprises all frequencies present differing from the blocked 25-cycle signal, is applied through coupling condenser 83 to control grid 84 of pentode 85, which is powered through load resistor 86, biased by cathode resistor 87 and supplied by screen resistor 88 with operating potential on its screen grid 89, which is by-passed by condenser 91. Resistor 92 serves as a grid leak, and condenser 93 by-passes cathode resistor 87 to avoid degeneration. Grid 75, energized as before mentioned, has a grid leak 96 connected to an appropriate potential on the voltage divider comprising resistors 97 and 98 which constitute its cathode resistor. Amplified output is obtained from plate 99 through RF choke 90 across coupling resistor 60. Choke 71 and condenser 50 decouple the triode to avoid transference of spurious signals through the power source wire, marked B+.

From the foregoing, it is evident that the 25-cycle output from rectifier-demodulator 61 is amplified by the two cascaded stages of twin triode 73 for application to the outgoing circuit via radio frequency choke 90. At the same time a negative feedback path around the first stage of the twin triode 73, and embracing the blocking filter 76–82 and pentode amplifier stage 85, feeds back negatively all signal components present except the 25 cycles, which is rejected by the filter, to thereby virtually suppress all frequencies except 25 cycles.

FIG. 15 illustrates the circuitry for continuously indicating the carrier frequency at which measurements are being made. It comprises essentially a counter type of frequency meter to which the rectified carrier waves are applied after being first formed into square waves of constant level and then into pulses still of constant level but of constant length regardless of frequency. Thus supplied with a train of uniform pulses, the meter will give an indication of the number of pulses per second, or frequency. For squaring the pulses, a series of diode clippers is used, the clipping level of the early stages being somewhat less than the latter stages in order to immunize against level variations in the incoming signal.

Referring further to FIG. 15, signals as received from the line are, after amplification, applied through a first condenser 101 and resistor 102 to the first grid 104 of a limiter comprising a triode portion of a first duplex triode 103. Four such stages are cascaded as a limiter. The grids 104 of the triodes are connected through isolating resistors 105 to appropriate constant bias voltage taps of voltage dividers comprising, respectively, series resistors 106, 107 and 108, and 115–119 both of which are connected between the positive high voltage supply and ground. A temperature sensitive resistor 116 shunts the resistor 119 to maintain the final clipping level voltage constant, despite any changes in ambient temperature which may occur.

Clipping is accomplished on the positive half cycle by rectifiers 109 which become conductive when the respective grid circuits are driven positive through the clipping level by applied signals, and by rectifiers 111, which conduct under similar conditions on the negative half cycle, thereby providing low impedance conductive paths to ground across which no additional tube driving voltage can be generated. These clipping levels are spaced equal distances above and below the constant bias supplied to the grids of the clipping tubes so as to produce a symmetrical output wave. Cathode resistors 112 provide grid bias to determine the plate current, changes in which develop output voltage in the plate load resistors 113. A coupling condenser 114 applies the clipped output to both grids 121 of tube 122, connected as a triode cathode follower stage, the quiescent grid potential being fixed by a selected bias voltage from a voltage divider comprising series resistors 124, 125 and 126 connected between the plate voltage supply and ground, as applied through the grid bias resistor 123. Output from the stage is taken through the differentiating condenser 127 across cathode resistor 128, to produce uniform length pulses which, when positive, flow through rectifiers 131 and resistor 132 and over conductor 139 to the common terminal of the oscilloscope and thence to oscilloscope selector switch 251 (shown on FIG. 18) and thence either to ground, or return via conductor 140 to the point of positive potential at the junction of resistor 125 and resistor 126 with its shunting condenser 129. On alternate half cycles, negative pulses flow through the rectifiers 135 and the D'Arsonval type meter 133 with its calibration shunt 134 and thence to ground or to positive potential as before, depending upon whether level or delay is being recorded, to provide an indication of frequency. The voltage drop in the resistor 132 produced by the said flow of positive pulses is filtered by the resistor 136 and condenser 137 for application over conductors 138 and 139 to the X-axis deflection and common terminals respectively of a cathode ray oscilloscope to provide a linear frequency base thereto as explained further in connection with the description of FIG. 18.

The return connection, over conductor 140, to a point of positive potential is necessary when recording delay since the common terminal of the oscilloscope cannot be grounded for this measurement, inasmuch as fine delay is measured across two ungrounded points of a bridge configuration.

The purpose of the series of vacuum tube stages of FIG. 17 is to convert the demodulated 25-cycle sine wave into two series of uniform sharp pulses, each having a frequency of 25 cycles per second but alternating symmetrically with each other so that after combining, rectifying, and discarding of the positive pulses by the double diode 202 of FIG. 18, a uniformly spaced series of negative pulses having the repetition rate of 50 per second will be furnished to the comparer tube 207 of this latter figure. To accomplish this, the wave is squared by four stages of diode clippers followed by a grid type clipper which also functions as a phase inverter. The final stage is a very fast acting squaring and amplifying stage which produces, after differentiation by the output coupling condensers, the two series of 25-cycle pulses, each pulse occurring at a crossover point of the original 25-cycle envelope wave.

Continuing the reference to FIG. 17, the amplified output described, which now has the form of a highly purified 25-cycle sine wave is applied through coupling condenser 151 and resistor 152 to a grid 154 of one section of a duplex triode 153, three of which double triodes comprise the six cascaded stages of a clipping and limiting circuit for squaring the signal, the first four of which operate in a manner similar to that described for the diode limiter stages 103 of FIG. 15. Potentiometers 171 provide adjustable portions of cathode resistance for use in conjunction with the appropriate cathode resistors 162 of the first tube 153 for signal balancing purposes, and resistor 188 in series with the voltage divider comprising resistors 158, 157, and 156 provides a constant bias to elevate the mean clipping level to a desired extent above ground potential. Numerals 151–164 indicate respectively components of the same kind and function as those of numerals 101–114 in FIG. 15, which contains similar circuits operating in the same way, as limiters.

Output from the diode limiter circuits is applied through coupling condenser 164 to grid 170 of duplex triode tube 172 which is retained at a predetermined bias level by connection through grid leak resistance 173 to a point on the voltage divider comprising resistors 174 and 175 between the plate supply potential and ground. Output from the first section of tube 172 is applied through coupling condenser 176 and current limiting resistor 177 to grid 178 which is similarly biased through resistor 179. By the use of a common cathode resistor 181 of relatively high value, grid clipping is achieved in tube 172. Balanced output from tube 172 is withdrawn through coupling condensers 182 and applied to grids 183 of duplex triode 184. Bypass condensers 185 across grid leak resistors 186 serve to further shape the output wave to the desired sharpness. Balanced pulses are withdrawn from tube 184 through coupling condensers 187 for application to the circuits shown in FIG. 18.

Pulse signals are applied to the cathodes 201 of duplex diode 202 shown in FIG. 18, the said cathodes being retained at a normal potential above ground by connection of its cathode resistors 203 to a tap on the voltage divider comprising resistors 204 and 205 connected in series between the plate voltage supply and ground. Negative pulses applied to either of cathodes 201 pass to the grid 208 of tube 207, while positive pulses are blocked. Thus fifty pulses per second, derived alternately from the positive going and negative going portions of the original regenerated modulation frequency wave, are provided at the instant of said wave going positive and negative, respectively.

As hereinbefore noted, the clipping level of the sections of the limited and shaping amplifier of FIG. 17 rises progressively from input to output so that the 25-cycle received wave is converted first into a uniform square wave and finally by the double diode 202 of FIG. 18 into a series of uniformly spaced, double frequency peaks. This high order of regularity overcomes "axis shift" and provides a perfectly timed series of pulses for delay measurement purposes regardless of considerable variation in received level and the incidence of noise.

A tuning fork standard of frequency 209 operating reasonably close to but not necessarily exactly at 200 cycles per second supplies this frequency to an amplifier and pulse former 211 to operate a 2-stage frequency divider 212, all of conventional kind. This frequency source is of the same general character as that already described in connection with FIG. 14; in fact the desired 50-cycle frequency may be extracted from the second stage divider thereof if such a source is available at the measuring point. Negative pulses at a repetition rate of 50 p.p.s. from this equipment, and similar pulses from diode 202 as described, are applied, respectively, to the opposite grids 208 of duplex triode 207 which is symmetrically connected for operation as a flip-flop, or bi-stable circuit. Resistors 213 shunted by condensers 214 provide the required cross-connection for this mode of operation between grids 208 and plates 215. Plate load resistors 216 are trimmed by potentiometer 217 to assure symmetrical operation of the flip-flop. Cathodes 217 of tube 207 are biased during operation by resistors 218 and a continuous bias level is maintained by resistor 219, adjusted by potentiometer 221 to establish a desired value of cathode current, thus providing calibration adjustment of the circuit. Grid leaks 222 are by-passed by condensers 223 to increase rapidity of operation. Signals withdrawn through load resistors 224 and smoothed by condenser 250 comprise bi-polar rectangular pulses having an algebraic value dependent in magnitude and direction on the relative timing of the continuous received pulse and reference pulse trains applied respectively to the two separate grids 208 of tube 207, the summation being zero when pulses arrive at the grids alternately at equal intervals. This signal is averaged by electrolytic condensers 225 connected back to back and applied to the zero center current meter 226 for coarse measurement of delay time in the manner already indicated in the discussion of FIG. 4. Currents so large as to be off the scale of the meter are rendered measurable by applying a zero depressing bias current through the meter, of an amount determined by one of the graduated resistors 227, 228 and 229, as selected by the ganged switch decks 231 and 232, which are so connected as to cause current to flow from the plate supply source through meter 226 to ground, in either direction as required, and according to its setting, over the positions lettered A–G. In the H position, a resistor 233 is placed in shunt with meter 226 to reduce its sensitivity.

For readings of delay where increased sensitivity is required, the right hand plate 215 of tube 207 is connected through a condenser 234 and resistor 235 to a grid 236 of duplex triode 237. The said condenser and resistor are of such values as to comprise a circuit having a long time constant, and this is further extended by degeneration in the unbypassed cathode resistor 238. Grid leak 239 is shunted by a condenser 241 which effectively relieves the triode of transient impulses, and as a result the space current supplied to the triode through the balancing potentiometer 242 and hence the potential of cathode 243 assumes a steady value determined by the average voltage of the preceding plate of tube 207. An additional cathode resistor 244 acts as an additional load resistor. The second triode of tube 237, including grid 245, cathode 248 and bias resistors 246 and 247 duplicates the like elements of the first triode and so provides a balanced or zero center circuit for the meter 249 for providing a fine scale measure of relative delay.

Some further explanation is in order as to the manner in which visual display is provided on an oscilloscope of received carrier level as determined by the level meter 64 of FIG. 16, and the delay as determined by meter 249 of FIG. 18, both in relation to the incoming carrier frequency as measured by the frequency meter 133 of FIG. 15. A detail of the connection to the oscilloscope is included in FIG. 18 where a 4-point switch at 251 is arranged to connect the oscilloscope to the delay meter in its upper position and to the level meter in its lower position. Referring now to this latter figure, it will be noted that since the frequency measurement provides the abscissa for both delay and level measurements, the conductors 138 and 139 from FIG. 15 are connected permanently to the X-axis and common terminals, respectively, of the oscilloscope. However, since the delay meter 249 is a zero center instrument connected across ungrounded points of a bridge, whereas it is desired that oscilloscope traces of delay be delineated from side to side across the full width of the screen, it is not practicable to connect the Y-axis input of the oscilloscope directly in parallel with the meter 249. Instead, the Y-axis terminal of the oscilloscope passes via the switch 251 and a resistor 253 to one terminal of the delay meter 249, while the common terminal of the oscilloscope connects via the same switch 251 and conductor 140 to a point of positive potential on the voltage divider 124–126 of FIG. 15. A condenser 252 shunts the Y-axis and common terminals as a noise suppressing measure.

The level meter of FIG. 16, however, has a grounded terminal and hence the potential applied to the oscilloscope for the measurement of frequency may employ ground return. For this measurement, the arms of switch 251 are moved downward to connect to conductor 300 which leads to the junction of resistors 62, 63 of FIG. 16 while at the same time grounding the common terminal of the oscilloscope. Conductor 303 provides a connection to the noise suppressing shunting condenser 302.

The arrangement just described for accommodating on a single oscilloscope measuremnets of both delay and level vs. frequency is but one of many possible arrangements which will suggest themselves in practice to persons using the instrument of my invention in its many versatile applications.

Some additional explanation should be provided relative to the manipulation of the scales for the coarse delay meter 226 and for the fine delay meter 249 indicated on FIG. 18. As previously indicated in connection with FIG. 4, the instrument measures delay basically in units of 20 milliseconds. Transmission delays encountered in the majority of transmission lines of moderate length and of elements of apparatus fall within this limit. It is also apparent upon reference to FIG. 4 that when delays in the neighborhood of zero, or of 20 milliseconds are being measured, that is, 0° or 180°, then if serious noise or other fortuitous disturbance is present, the pointer may oscillate erratically from end to end of the scale. It is desirable, therefore, to avoid the scale extremities of the instrument when making measurements.

The scale selector switch 231–232 has been designed with this end in view and it is arranged to select seven different areas, each of five milliseconds in length, all lying within the 20 millsecond range limit. Furthermore, adjacent ones of the seven areas overlap so that for delay changes not exceeding 2.5 milliseconds, an appropriate scale may, in most instances, be found. This will be evident from perusal of the scale distributions as indicated in the following table:

| Switch position: | Range covered (milliseconds) |
|---|---|
| A | 0–5 |
| B | 2.5–7.5 |
| C | 5–10 |
| D | 7.5–12.5 |
| E | 10–15 |
| F | 12.5–17.5 |
| G | 15–20 |
| H | 0–20 |

As another expedient, the area under measurement can be moved from the meter scale extremities by momentarily interrupting operation of the fork which supplies the reference frequency so that the delay indication will relocate itself on the meter. Other alternative expedients will be readily apparent.

When the delay variation over the frequency sweep range is less than 5 milliseconds as observed on the coarse delay meter, the amplified or fine scale, delay meter may be used advantageously.

*Active type compensating networks*

Much has already been explained in connection with the basic bridge networks of FIGS. 5, 6 and 7 in regard to the basic design considerations, and of the use of these networks in iterative sequences when including amplifying elements for the purpose of compensating dissipation losses in the network elements and for providing suitable coupling transformations between network circuits having high input impedance and low output impedance or vice versa. Furthermore, it has been pointed out that bridge ratios in the neighborhood of $K=3$ permit separate and independent adjustment in respect to delay and amplitude, and ratios of $K=5$ give like properties, with a wider range of delay adjustment although networks embodying this ratio have somewhat less general applicability.

The adaptation of two examples of these basic networks into practical assemblies including a vacuum tube for each section for purposes of delay and amplitude compensation will now be described.

FIG. 12 illustrates a series of active corrective networks 315 to 321 each of which may be of the basic type of FIG. 7 previously described, that is, constant voltage, $K=3$, low impedance input, high impedance output. Network 315 illustrates an intermediate section in which the input grid 302 of double triode 301 receives the output from a previous network over a conductor analogous to output conductor 322 of this same section. Obviously the initial and concluding networks of a series would be provided with appropriate balanced coupling devices such as transformers for connecting the network sections to input and output transmission lines.

The phase inverting duplex triode 301 is actuated by line signals applied to its grid 302 to cause a changing space current to flow through cathode resistor 303, and thus to alter the potential of cathode 305 with respect to grid 306. Such changes are seen to occur oppositely on the two grids, and the consequent push-pull output from the plates 307 is applied to the primary of transformer 308. Because of its class A operation, this circuit has a high input impedance which favors it as a coupling element between sections and, by isolating the sections from each other, permits independent adjustment of each. The use of a balanced transformer 308 for load coupling reduces low frequency attenuation by preventing loss of transformer inductance through saturation of its core due to space current from the tube 301, and also avoids difficulties due to phase shift by obviating the need for coupling and bypass condensers. Transformer 308 possesses a step-down ratio of approximately 6 to 1 in order to present a suitable relatively low impedance to the following corrective networks, resulting in the most effective operation thereof.

A voltage divider comprising resistors 309 and 310 is connected across the secondary of transformer 308, and applies signal voltage to the corrective network elements comprising variable resistor 311 and the parallel combinations including variable resistor 312, inductance 313, and condenser 314. As previously developed it has been found that the ratio of signal voltages applied by the voltage divider to the corrective elements is important to the correct operation of the entire nework. This raio is given by the ratio of resistances of resistor 309 to that of 310 in the instant arrangement. Obviously, equivalent structures for this purpose, such as an appropriately tapped transformer or autotransformer can be used instead of a resistive voltage divider, if desired, and such a transformer, although more expensive and without any advantage, has been found to operate equally satisfactorily.

The ratio of signal voltages applied to the network branches, previously mentioned as critical, has been fixed in networks of the prior art at a value in a narrow range approximating unity as the optimum and have possessed only limited utility. The instant network, on the other hand, employs such a ratio in a narrow range having a center value of approximately three, whereby the advantages already described are obtained.

Resistors 311 and 312 when adjusted simultaneously set the delay of the section at any desired point within the available range of the equipment. When adjusted separately the amplitude characteristic thereof is varied according to their ratio. For unity ratio, the amplitude characteristic of the circuit is substantially flat. FIGS. 8, 9 and 10 illustrate the results readily obtained by such manipulation.

A typical active network unit consists of eight sections in which the factor K may be equal to three with the delay peaks of the sections occurring at approximately 375 cycle intervals over a range of 600 to 3200 cycles. The spacing need not be uniform but may be varied according to the nature of the delay characteristics of the line to be compensated. Each section will furnish a range of adjustment from about 100 microseconds to a maximum of 1500 microseconds. When the sections are inserted in tandem, the delay at any frequency will be the sum of the individual section delays at that frequency. As before mentioned, the resonance-like curves, given with suitable distribution, will give a satisfactorily flat delay curve with only minor peaks appearing as illustrated in FIGS. 8, 9 and 10. At the same time appropriate corrections for attenuation may be made by the same networks.

The adjustable delay networks previously described may be used in combination with fixed networks where desirable. Often fixed networks may be used for the correction of relatively flat delay ranges while the variable networks may be used for compensating irregular or peaked areas. Since it is not possible with fixed networks to provide independent compensation of delay and amplitude, this latter correction must be accomplished either by the variable networks or by separate attenuation equalizers.

FIG. 20 illustrates a somewhat different type of active section, being of a constant current, $K=3$, high impedance input, low impedance output type and hence adapted to pentode type tubes as the amplifying element. These sections may be cascaded in the same manner as was discussed under FIG. 12. In FIG. 20 input signals to the control grid 401 of a pentode tube 402, having a grid leak 403 connected thereto, cause changes in the space current flowing through plate resistor 404 and screen resistor 405 from plate 406 and screen 407, respectively, to the cathode 420 of the tube and thence through cathode resistor 408 to ground. Condenser 409 connected between screen 407 and ground operates as a screen bypass. Amplified signals developed in resistor 404 by said changes are applied by the coupling condenser 416 to a delay distortion corrective network comprising components 409 through 414, which have the same nature and function as components 309 through 314 of FIG. 12, previously described. An output transformer 415 provides impedance matching to following stages.

Performance of the circuit of FIG. 20 is substantially identical to that of the analogous circuit 315 of FIG. 12, insofar as the phase shift introduced by condenser 416 will permit, as heretofore mentioned. The critical ratio of values of resistor 409 to that of 410 is again $K=3$ in the sense described in connection with FIG. 12.

Convenience and independence of the network section amplitude and delay adjustments have rendered the above described circuits, with their unique ratio of $K=3$ between the impedance elements driving the branches, advantageous and desirable for application to existing transmission channels. By the use of a critical ratio of $K=5$, however, and by substituting for the resistor 311 of FIG. 12 or 411 of FIG. 20 the network shown in FIG. 21, a network is produced having about twice as much phase shift per stage as those previously described.

In FIG. 21, 418 is an inductance element which need be adjustable only if it is desired to make provision for varying the tuning of the delay network section to operate on different frequencies, 417 is a condenser connected in parallel therewith, and 419 is an adjustable resistor connected in series with the aforesaid parallel combination, the whole to comprise a network intended to be substituted in place of the resistor 311 or 411 of FIGS. 12 and 13 respectively at a time when the ratio existing between the values of resistors 309 and 310, and between 409 and 410 thereof respectively has a critical value of $K=5$.

Obviously, the number of vacuum tubes and the associated circuitry is thereby greatly reduced, in cases where large amounts of delay distortion must be overcome. The difficulty of adjusting amplitude response to a constant value is such, however, as to render these circuits less useful than those of critical ratio $K=3$. For certain applications, and where large amounts of delay compensation are needed, then networks of the foregoing type may provide the most economical solution.

Only three types of active network have been described in detail. However, it is possible to design a very considerable variety of these circuits employing the basic principles outlined herein, of which the most useful, convenient and economical bear the ratio factor $K=3$, or $K=5$. Various alternative designs within the limits of my invention will suggest themselves to persons familiar with this art and, making further use of the measuring instrument of the invention, experimental networks may be set up and readily examined as to their delay and attenuation characteristics.

*Measurement of absolute delay*

The discussion up to this point has concerned itself primarily with the measurement of relative delay. However, if both the input and output terminals of the line or device under measurement are available at one point so that a single frequency source may be used for both the transmitted envelope and the reference frequency at the receiver, then measurements of absolute delay are equally practicable. This will be evident from attention to FIG. 13, the only change being that the flip-flop Q of the receiver connects to the output of the second stage of the 3-stage divider D instead of the pulse former P.

The technique to be followed may be as follows: First, the delay of the measuring instrument itself should be measured by connecting the transmitting section directly to the receiving section and measuring the delay over the frequency range of interest. This measurement as read on the coarse delay meter, should give a substantially constant value and should, of course, be subtracted from the delay readings obtained after inserting the line or device to be measured between the transmitter and receiver sections. Various of the 5 millisecond scales already described in connection with FIG. 18 may be used and, in accordance with the table outlined there, a factor appropriate to the scale must be added to the meter reading. For example, if when using scale 2 the delay of the instrument itself measured 1.3 milliseconds and subsequently the delay of the device under test measured 3.5 milliseconds on scale 4, then the computation for the delay of the test circuit would be as follows:

| | Milliseconds |
|---|---|
| Scale **4** (line) | 3.5+7.5=11.0 |
| Scale **2** (instrument only) | 1.3+2.5= 3.8 |
| Absolute delay of line under test | 7.2 |

Since the capacity of the instrument, as described, limits it to direct measurement of delays of 20 milliseconds, should the delay of the circuit being tested, plus the delay of the instrument, exceed 20, 40, 60 milliseconds, etc., then the instrument will indicate only the delay in excess of such value. Delays in excess of 40 milliseconds will rarely be encountered. The number of 20 millisecond factors will generally be obvious from general acquaintance with the characteristics of lines, etc. and this should be added to the delay indicated by the instrument to obtain the total absolute delay. It is evident also that should the meter indicate a delay value less than the measured delay of the instrument itself, then the total absolute delay has exceeded 20 milliseconds.

*Alternative measuring equipment*

The previously described generalized delay measuring instrument of FIG. 13 embodying the detailed circuitry of FIGS. 14 to 18 is capable of rendering valuable service for measuring relative or absolute delay for the various purposes outlined. A somewhat different arrangement superior in respect to accuracy, stability and convenience, particularly in the method of obtaining delay readings, is outlined in FIG. 22. The instrument of FIG. 22 employs a tuning fork generator, preferably of the improved type described in my aforesaid co-pending application, U.S. Ser. No. 727,354, filed Apr. 9, 1958, now Patent No. 2,998,576, issued Aug. 29, 1961, operating, for example, at a frequency of 2 kc. and followed by a series of frequency dividers to produce a highly stable and purified sine wave frequency of 500 cycles. This latter frequency is then applied to an adjustable cycle shifting network to introduce several steps of delay of, for example, one millisecond each, and then passes to further limiting, pulse forming and frequency dividing elements to eventually produce the 50-pulses per second needed as a reference frequency at the receiver, and finally, but not shown in FIG. 55, the 25-cycle sine wave envelope needed as the modulation frequency at the transmitter. Further improvements include a simplified meter circuit which is virtually free of the effect of the confusion points previously referred to and permits the oscilloscope to be used in a normally grounded manner.

Details of the improved system of FIG. 22 follow: A tuning fork generator 351 operating at a frequency of 2 kc. energizes a pair of binary dividers 352 to produce a frequency of 500 cycles. Active bandpass filter 353, which may be of the type described at 73 in FIG. 16 or other suitable alternative, then supplies a pure sinusoidal voltage to the phase shifter 354. Resistor 356 matches said phase shifter to the preceding filter. The two sets of resistors 357, 358 and 359 which are graduated in resistance value, are connected respectively in series with two sets of condensers 361, 362 and 363 which are inversely graduated in capacity value to provide six phase shifting networks for connection across the two terminals of resistor 356. The six junction points of the resistors and condensers are connected through resistors 364 all of which may be of like value to six taps of the eight-point switch 366 as shown. The two remaining taps of switch 366 are carried also through resistors 364 directly to the two opposing terminals of resistor 356. It is evident that with switch 366 connected as indicated in FIG. 22, rotation of movable contact 365 provides a series of uniform phase displaced voltages encompassing an entire cycle of the 500 cycle frequency. As will be explained later in connection with scale manipulation of the measuring instrument, only moderate accuracy of the phase shifting networks connected to terminals 2, 3, 4, 6, 7 and 8 of the switch is necessary. Points 1 and 5 of the switch, however—and these points may be termed "cardinal points"—connect directly to the terminals of resistor 356 and hence each represent a precise half-cycle, or 1 millisecond displacement.

A 500-cycle sine wave voltage to ground, continuously adjustable stepwise as to phase in either the advance or retard direction by the manual rotation of switch 366, is thus applied to limiter 367 and thence to pulse former 368. Pulses therefrom are applied to multi-vibrator dividers 369 and 371 successively to produce sharp pulses having a repetition rate of 50 per second, continuously adjustable stepwise in either direction as to arrival time by rotation of switch 366. These pulses serve as receiver reference pulses while a further divider stage, not shown, may provide the 25-cycle envelope wave for a transmitter of the type shown in FIG. 14. The limiter 367 and pulse former 368 may be of the types shown in FIG. 17, while the frequency reducing multivibrators 369 and 371 may be of the types referred to in connection with FIG. 14.

Such pulses, as well as pulses of like rate derived by demodulation and limiting from the received carrier wave are applied to the two input grids, respectively, of a bi-stable flip-flop 372 comprising two triodes, as previously explained in connection with flip-flop 207 of FIG. 18. Output pulses therefrom in conductors 373 and 374, shaped by condensers 375 drive grids 376 of D.C. amplifier triodes 377 to produce a voltage drop in the grounded load resistor 379 and bias resistor 381 of the triode then conducting. Such voltage drop is oppositely directed in each of the two triodes so that the zero center milliammeter 383, which is connected to the cathodes 378 via resistors 380 by switch 384 reads zero average current only when the reference pulses enter the flip-flop 372 at times precisely centered in the interval between the receiving channel wave pulses; if received before that time, an average meter current flows in one direction and if after, in the opposite direction all as previously explained in connection with FIGS. 4 and 18. Switch 384 controls resistors 387 for modifying the sensitivity of the meter and so provide different delay scales. Rectifiers 388 are connected to meter 383 when ganged switch 384 is set to the low range (high sensitivity) position in order to protect the meter against excessive flow of current. Resistor 389 and condenser 391 connected to cathode 378 provide average cathode voltage to the vertical deflection plates of Cathode Ray Oscilloscope Indicator 392 while variable resistor 393 enables variable negative bias potential to be applied thereto sufficient to permit the convenient operation of oscilloscope 392 at ground potential.

It will be apparent from the foregoing that the improved circuit of FIG. 22 provides measurements of relative delay on the delay meter 383 fully equivalent to those appearing on the meter 226 of FIG. 18, although the flip-flop and meter scale circuitry are quite different. In the instrument of FIG. 18, in order to cover a wide range of delay measurement and to deal with the occurrence of confusion points, it was necessary to provide a rather elaborate system of overlapping scales for the meter. To maintain the same high order of accuracy for each scale imposed not only a severe design requirement, but also the complexity of the scales slowed the measuring procedure and tended to introduce errors. These difficulties are very largely overcome in the measuring arrangement disclosed in FIG. 22. Normal measuring procedure when using this circuit will now be described.

In the instrument of FIG. 22 measured delays are indicated on the meter 383 in conjunction with the cycle shifting switch 366, the measurement being made conveniently in milliseconds and decimal fractions thereof. The meter includes as one of its scales a full scale value of 1 millisecond. Switch 366 in conjunction with the phase shifting network 354 may conveniently introduce delays of, say, 2, 10 or 20 milliseconds. In the present description a 10 millisecond full scale value for the switch will be assumed, that is, the dial will include ten click stops of which numbers 1 and 2 will correspond to cardinal points 1 and 5 of switch 366 as shown. This 2 milliseconds of delay corresponds to a shift of one full cycle at the 500 cycle frequency. In order to provide 10 milliseconds of delay, switch 366 actually is built to include a total of 40 points with each point multiplied successively to the succeeding eighth point, thus providing the additional cardinal points 3 to 10. By this expedient the eight element phase shifting network shown serves to encompass 5 cycles or 10 milliseconds. In the same manner, by employing an 80 point switch, a total of 20 milliseconds could be encompassed. This construction, it is believed, will be obvious without further elucidation.

As previously noted, only the cardinal points 1 and 5 of switch 366 appear on the switch dial, or scale, representing 1 millisecond intervals. Points 2, 3, 4, 6, 7 and 8 together with the associated phase shifting networks are necessary only to provide a graduated or controlled shift in phase as this cycle shifting dial is operated. Without these networks, uncontrolled shifts of more than one cycle, and in either direction, may occur.

At the beginning of a measurement the meter pointer may be brought to its left hand position to indicate zero relative delay as a starting point by adjustment of the cycle shifting switch 366 and by a fork frequency adjustment, if provided, on the oscillator 351. Then, as the incoming carrier frequency sweeps over the range being measured, if the delay exceeds the meter scale of 1 millisecond, then the meter may be returned to scale by introducing additional delay of one or more milliseconds by rotation of calibrated switch 366. The delay reading will then comprise the sum of a digit read from the switch dial and a decimal fraction read from the meter dial and will be in terms of milliseconds, for example 8.675 milliseconds. Delay readings made with this instrument possess extraordinarily high accuracy. At the cardinal points it is evident that the accuracy is the same as that of the fork oscillator 351 and may be on the order of a few parts in $10^6$. In addition to the one millisecond scale, the meter may also be provided with additional scales, for example five milliseconds and 20 milliseconds. These are useful for making somewhat more rapid measurements and may be introduced by the operation of the ganged switch 384.

In the example shown in FIG. 22 the cycle shifter 354 is introduced at the 500 cycle stage of a frequency reducing chain which derives an ultimate 50 cycles from an original highly stable 2,000 cycle source and the switch 366 conveniently indicates ona dial highly accurate cardinal point intervals of 1 millisecond. Obviously, an appropriately designed cycle shifter-switch combination could be inserted at any stage of the chain, including the original source. The higher the frequency selected for phase shifting, the smaller are the time intervals appearing on the switch dial and the more precise the readings. For example, a cycle shifter designed for 5,000 cycles would give cardinal point steps of .1 millisecond. Hence these steps may be made as small as desired, but as the frequency increases it may be necessary to substitute a crystal controlled type of oscillator of well known type for the fork type basic source 351 of FIG. 22.

Connection of the cathode ray oscilloscope 392 into either the delay measuring circuitry of FIG. 22 or the level measuring circuitry of FIG. 16 in a manner corresponding to that previously described in connection with FIG. 18 may be accomplished in an obvious manner.

The effect of the confusion points described in connection with FIG. 18 has been greatly reduced in the meter circuitry of FIG. 22. By adjustment of cycle shifter 354, the delay range under measurement may be readily shifted away from a confusion point and, due to the improved stability of the fork generators, this condition will usually hold for many hours before again drifting into a confusion point.

To briefly recapitulate, my invention has provided a means for measuring relative delay of transmission lines of any length and without the need of an auxiliary paralleling circuit of high stability for providing a synchronous reference source of comparison frequency at the receiving terminal where measurements are in progress. At the same time, coordinated measurements of attenuation for the circuit may be made. In accordance with indications revealed by these measurements, compensation of delay and amplitude irregularities may be readily and promptly performed by means of the compensating networks also part of my invention. By means of the measuring instrument as described, together with the compensating networks, long transmission lines may, in a matter of hours, be measured, compensated, and placed in condition for the transmission of high-speed facsimile, data codes or other modes of high-speed signal transmission. Without the use of my invention, such a procedure would consume days or weeks of time of highly skilled technicians.

The foregoing drawings and description represent a specific embodiment of certain preferred forms of the present invention. Obviously, numerous alternatives will occur to those skilled in the art, which nevertheless lie within the spirit of the inventive concept here disclosed. It is, therefore, intended that this invention shall be limited only by the scope of the appended claims.

What is claimed is:

1. Means for correcting amplitude and delay distortion in a transmission path, comprising:

(a) a plurality of mutually cascaded frequency band selected corrective networks for individual correction of predetermined frequency bands within a transmission band transmitted in said path, each of said networks comprising first and second resistors adjustable for amplitude and delay correction over an aliquot portion of said transmission band which includes a modulated carrier varying in frequency; and (b) cathode ray oscilloscopic means for measuring distortion, comprising:

(1) a screen for displaying a visible pattern in rectangular horizontal and vertical coordinates, (2) horizontal deflection means for said pattern including capacitance and rectifier means connected in circuit with said path and responsive to said carrier to produce a horizontal sweep of said pattern positioned on the screen according to the angular velocity of said carrier, (3) first vertical deflection means for said screen connected in circuit with said path and including means responsive to amplitude of said carrier to produce on said screen a first pattern whose nonlinearity is a measure of amplitude distortion in said transmission path, and (4) second vertical deflection means for said screen connected in circuit with said path and including means responsive to rate of change of carrier delay with respect to carrier angular velocity to produce on said screen a pattern whose nonlinearity is a measure of rate of change of carrier delay, whereby adjustment of the first resistor until the first pattern is linearized corrects the amplitude distortion in said transmission path, and whereby adjustment of the second resistor until the second pattern is linearized stabilizes the carrier delay in said path.

2. The method of compensating irregularities in transmission delay over a range of frequencies in a transmission channel having widely separated terminals which comprises the steps of:

(a) measuring said irregularities by:

(1) transmitting over said channel a test wave envelope derived by modulating a highly stable low frequency wave on a carrier so as to produce a wave limited to a carrier and two first order side bands;

(2) varying said carrier in frequency over at least a part of the transmission frequency range to be compensated;

(3) receiving the carriers and recovering therefrom the wave envelope and the respective carrier frequencies;

(4) indicating said carrier frequencies;

(5) squaring the form of said wave envelope in a succession of limiting states, the initial stages thereof having lower limiting levels than the latter stages;

(6) producing repetitive peak pulses of like polarity, one for each crossover of the axis of symmetry by the squared waves;

(7) comprising the time instants of occurrence of said received pulses with similar pulses derived from an independent, highly stable reference wave source having a nominal harmonic relationship to the frequency of said wave envelope but random phase relationship therewith; and (8) indicating the time difference between said sets of pulses as a linear measure of the relative transmission delay over said channel at the indicated frequencies; and (b) compensating said irregularities by:

(1) connecting in series with the said channel a plurality of tandem connected bridge type networks, each including a pair of fixed arms having a ratio not less than 2 to 1, a resistance arm, and a reactance arm also including resistance, said networks having unlike input and output impedances and possessing means for varying transmission time delay therein over a narrow range of frequencies but overlapping into adjacent areas, and impedance transforming, unidirectional gain producing transducers intercoupling said networks without impedance mismatch whereby said networks may be independently adjusted; and (2) adjusting said networks step by step in consonance with the indicated measurements step by step so that the aggregate delay, as introduced by said networks in both narrow and overlapping areas, produces a final time delay characteristic for said transmission channel that is substantially linear with frequency.

References Cited

UNITED STATES PATENTS

| | | | |
|---|---|---|---|
| 1,518,543 | 12/1924 | Nyquist | 324—57 |
| 2,411,423 | 11/1946 | Guptill | 323—123 |
| 2,467,974 | 4/1949 | Glass | 328—155 XR |
| 2,577,992 | 12/1951 | Armstrong | 323—123 |
| 2,790,956 | 4/1957 | Ketchledge | 333—28 |

RUDOLPH V. ROLINEC, *Primary Examiner.*

E. E. KUBASIEWICZ, *Assistant Examiner.*